United States Patent
Nakao

(10) Patent No.: US 6,906,887 B2
(45) Date of Patent: Jun. 14, 2005

(54) RECORD/REPRODUCE EQUIPMENT OF A MAGNETIC TAPE, A SERVO CONTROL METHOD THEREOF, A SERVOWRITER THEREOF, AND A MAGNETIC TAPE USED IN RECORD/REPRODUCE EQUIPMENT

(75) Inventor: Toru Nakao, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 165 days.

(21) Appl. No.: 10/301,704

(22) Filed: Nov. 22, 2002

(65) Prior Publication Data

US 2003/0099059 A1 May 29, 2003

(30) Foreign Application Priority Data

Nov. 29, 2001 (JP) ........................................ 2001-364548

(51) Int. Cl.[7] .............................................. G11B 5/584
(52) U.S. Cl. ...................................................... 360/77.12
(58) Field of Search ................................ 360/77.12, 21, 360/48, 75, 76, 78.02

(56) References Cited

U.S. PATENT DOCUMENTS

| | | | | |
|---|---|---|---|---|
| 4,979,051 A | * | 12/1990 | Eggebeen | 360/21 |
| 5,450,257 A | * | 9/1995 | Tran et al. | 360/76 |
| 5,689,384 A | | 11/1997 | Albrecht et al. | |
| 5,923,494 A | * | 7/1999 | Arisaka et al. | 360/78.02 |
| 5,982,711 A | * | 11/1999 | Knowles et al. | 360/77.12 |
| 6,172,837 B1 | * | 1/2001 | Fasen | 360/75 |
| 6,228,461 B1 | * | 5/2001 | Sueki et al. | 428/98 |
| 6,462,899 B1 | * | 10/2002 | Chliwnyj et al. | 360/77.12 |
| 6,525,898 B1 | * | 2/2003 | Chliwnyj et al. | 360/77.12 |
| 6,542,325 B1 | * | 4/2003 | Molstad et al. | 360/77.12 |
| 6,614,607 B1 | * | 9/2003 | Rothermel et al. | 360/48 |
| 6,741,415 B1 | * | 5/2004 | Okuda et al. | 360/75 |

* cited by examiner

*Primary Examiner*—David Hudspeth
*Assistant Examiner*—Fred F. Tzeng
(74) *Attorney, Agent, or Firm*—Sughrue Mion, PLLC

(57) ABSTRACT

A servo control method controlling the position of a magnetic head in order to record/reproduce a data on/from a magnetic tape having a number of servo tracks, is performed along the following manner. First, a servo signal is written to each servo track of the magnetic tape. Next, a position in the with direction of the magnetic head is adjusted based on the servo signal written on the magnetic tape when performing the record/reproduce of a data on/from the magnetic tape. Next, the servo signal written on each of two servo tracks is read simultaneously. Here, the two servo tracks are selected among a plurality of servo tracks provided in the magnetic tape. Finally, the position in the width direction of the magnetic head is determined based on two servo signals, which are written on one servo track and another servo track of the above selected two servo tracks, respectively.

30 Claims, 12 Drawing Sheets

FIG.1
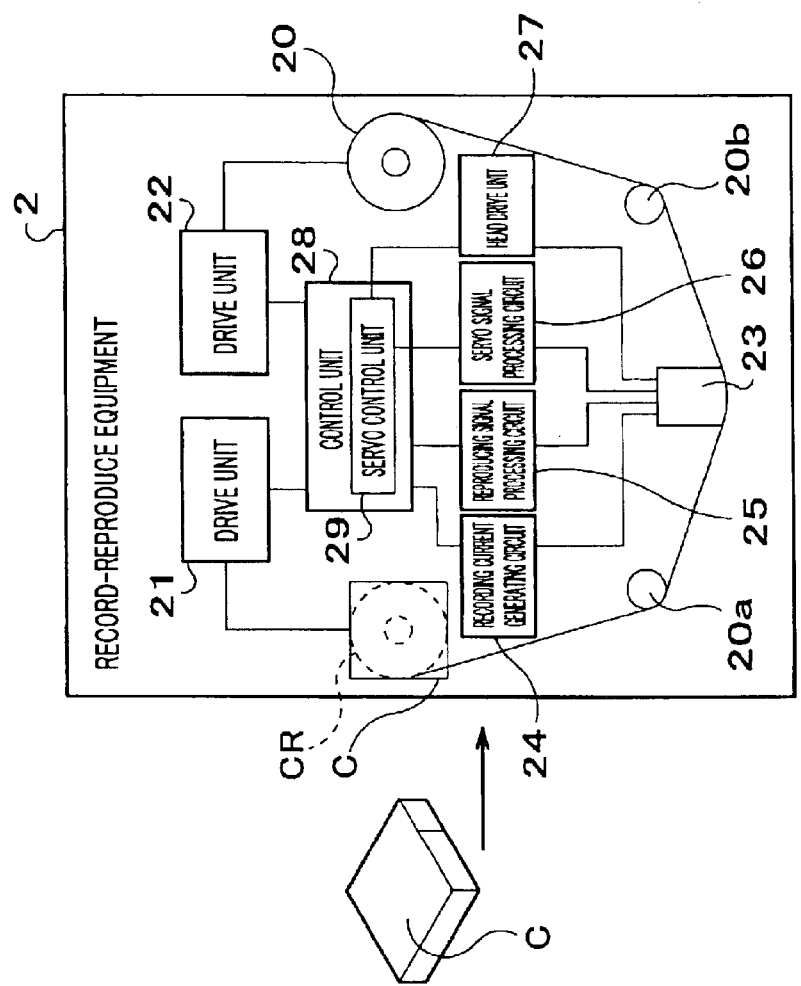
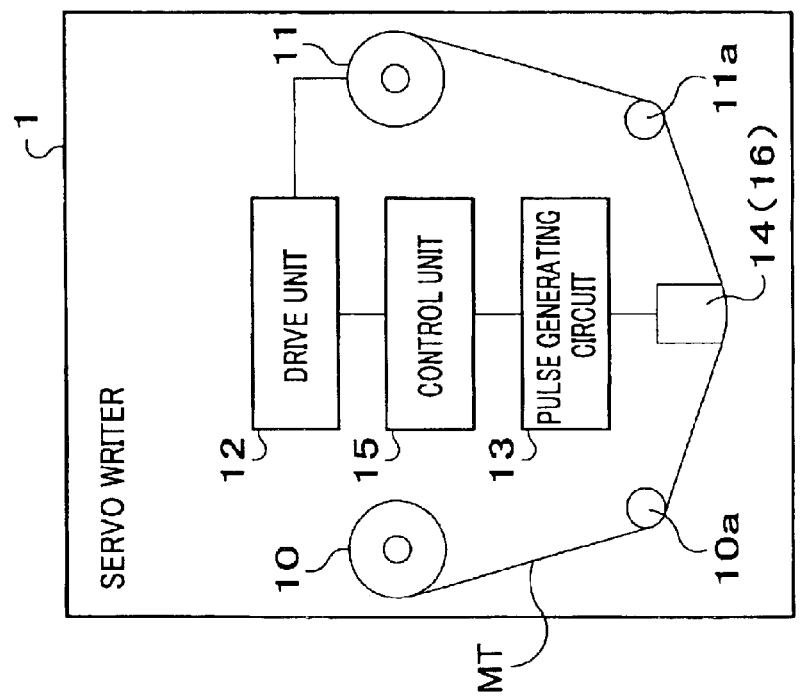

RECORD/REPRODUCE EQUIPMENT OF A MAGNETIC TAPE, A SERVO CONTROL METHOD THEREOF, A SERVOWRITER THEREOF, AND A MAGNETIC TAPE USED IN RECORD/REPRODUCE EQUIPMENT

BACKGROUND OF THE INVENTION

1. Field of the Invention

The present invention relates to a method for a servo control, by which the position in the width direction of the magnetic head is controlled based on the servo signal written on a magnetic tape.

The present invention, furthermore, relates to a record-reproduce equipment for magnetic tape, a servo writer equipped in the record-reproduce equipment, and a magnetic tape used in the record-reproduce equipment for a magnetic tape.

2. Related Art

In recent years, a high-density recording technique applied to a magnetic tape has been developed rapidly. In the case of a magnetic tape to be used for a backup of a data of computer, for example, it is well known that a magnetic tape having about 100 G bytes recording capacity.

For recording such large size data, data tracks of several hundreds are formed in a line along the width direction of a magnetic tape. Thereby, not only the width of the data track itself but also the gap between the adjoining data track become extremely narrow.

The record-reproduce equipment, which is used for recording/reproducing the data on/from the magnetic tape, equips with a magnetic head including a plurality of record-reproduce devices.

In the record-reproduce equipment of the magnetic tape adapted for a high-density recording, generally, the numbers of the read-write devices are not same as the numbers of the data tracks.

Thus, the recording or reproducing of the data is performed by changing the data track in due order.

To be more precise, when the recording or reproducing of the data by the magnetic head is performed from one end to another end of the data track, the position in the width direction of the magnetic head is shifted to just above the adjoining data track. Then, the recording or reproducing of the data by the magnetic head is performed from another end to one end. By repeating this motion of the magnetic head for several times, the recording/reproducing of the data on/from the magnetic tape is achieved.

In the record-reproduce equipment of the magnetic tape, therefore, the position of the magnetic head should be accurately controlled so that the magnetic head is positioned just above the data track for achieving the recording or reproducing of the data.

The magnetic tape, generally, is a thin film. Thus, the subtle winding in the width direction of the magnetic tape may be arisen when the magnetic tape is fed to the longitudinal direction by the record-reproduce equipment.

If such winding of the magnetic tape is arisen, the relative location between the data track and the recording-reproducing device may go wrong. In other words, the position of the record-reproduce device may not agree with the data track because the position of the magnetic head is displaces in the width direction with respect to the magnetic tape.

For alleviating this problem caused from the miss-location, a servo-control method, in which the position in the width directions of the magnetic head is controlled based on the servo signal written on the magnetic tape, has been known.

In this servo-control method, the writing of the servo signal to the servo track of the magnetic tape is performed by the servo writer. The positioning of the magnetic head is performed based on the servo signal, which is readout by the record-reproduce equipment.

As another examples of servo-control methods, a timing based servo method and an amplitude servo method are also well known. In the timing based servo method, the positioning is performed based on the servo timing of the servo pattern. In the amplitude servo method, on the other hand, the positioning is preformed based on the width of the servo pattern.

In the case of the timing based servo method, servo signal is generally written on a plurality of servo tracks, which are arranged in the width direction of the magnetic tape. The servo signal is a signal consists of a group of servo pattern units, in which each servo pattern unit is arranged at the predetermined interval along the longitudinal direction of the magnetic tape.

The servo pattern unit is also consisting of a plurality of nonparallel servo patterns. This nonparallel servo pattern is pair of patterns, in which each pattern are located symmetrically with respect to the width direction axis of the magnetic tape in the condition that each pattern has a predetermined intersection angle with respect to the longitudinal direction axis of the magnetic tape.

The servo writer has a servo write head, which is used to write the servo signal on the magnetic tape.

The servo write head has a plurality of head gaps having a shape of unparallel servo pattern. The numbers of head gaps are same as the numbers of servo tracks of the magnetic tape.

In this servo writer, the writing of the servo signal on the magnetic tape is achieved using the magnetic flux, which is generated by supplying the writing current to the coil of the servo write head and is leaked from the head gap.

The writing current consists of a zero current and a pulse current having a positive or negative polarity. When the pulse current of positive or negative polarity is supplied at predetermined timing, each nonparallel servo pattern provided on the servo write head is magnetized.

Thereby, the signal, which has a plurality of the magnetized servo patterns in the longitudinal direction of the magnetic tape, is written on the magnetic tape.

In the record-reproduce equipment of the magnetic tape, incidentally, a servo signal readout device is provided on the magnetic head. The servo signal readout device is composed of MR devices (Magneto Resistive device). In this servo signal readout device, the readout of the servo signal is achieved based on the change of the electric resistance of the MR device. This change of the electric resistance is caused by the external magnetic field.

In the record-reproduce equipment of the magnetic tape, furthermore, the position of the servo signal readout device is changed when the recording or reproducing of the data on or form the magnetic tape is performed from one end to another end of the magnetic tape. In that occasion, the servo signal readout device is shifted with same shifting amount at every shifting.

As an example of the servo signal, as shown in FIG. 12, servo signals SS recorded on servo tracks ST is known. These servo tracks ST are provided in the width direction of the magnetic tape MT.

In each servo signal SS, two nonparallel servo patterns SP and SP are arranged with short interval (C) along the longitudinal direction of the magnetic tape MT. This unit of two nonparallel servo patterns is also arranged with long intervals (B).

In the record-reproduce equipment of the magnetic tape, generally, the positioning of the magnetic head is performed based on one servo signal SS if readout of the servo signal SS can accurately be achieved.

To be more precise, the displacement in the width direction of the servo signal readout device, a magnetic head, is detected based on the ratio between the interval A1 and interval B. Here, the interval A1 corresponds to the distance between each pattern of the nonparallel servo pattern, and the interval B corresponds to the distance between the parallel patterns of each servo pattern units, which are adjoining with large interval.

The position of the servo signal readout device is in proportion with the ratio between the interval A1 and interval B. The position of the servo signal readout device is computed based on Formula (1) when the length between the nonparallel servo patterns SP is narrow. On the contrary, the position of the servo signal read out device is computed based on Formula (2) when the length between the nonparallel servo patterns SP is wide.

$$POS1 = k(A1)/(B) \qquad (1)$$

$$POS2 = k(A2)/(B) \qquad (2)$$

Here, POS1 is the computed position of the servo signal readout device, wherein the readout is performed at the narrowest position of the nonparallel servo pattern. POS2 is a computed position of the servo signal readout device, wherein the readout is performed at the widest position of the nonparallel servo pattern. A1 is an interval between the patterns of the nonparallel servo pattern, wherein the readout is performed at the narrowest position of the nonparallel servo pattern.

A2 is an interval between the patterns of the nonparallel servo pattern, wherein the readout is performed at the widest position of the nonparallel servo pattern. B is an interval between the servo pattern units. K is a coefficient.

In such types of the record-reproduce equipment of the magnetic tape, however, when the expansion and the contraction of the magnetic tape or the change of the feeding speed of the magnetic tape is arisen while recording the servo signal on the magnetic tape using the servo writer, the detecting cycle of the long interval B of the servo signal SS may be changed.

In that occasion, as shown in FIG. 12, the detecting cycle of the interval B may be changed as "B+ΔB" or "B−ΔB".

When the readout by the servo signal readout device is performed at the position where the interval of the nonparallel servo pattern is narrowest and if detected long interval is B+ΔB, the position of the servo signal readout device is computed from Formula (3).

On the other hand, when the readout by the servo signal readout device is performed at the position where the interval of the nonparallel servo pattern is widest and if detected long interval is B+ΔB, the position of the servo signal readout device is computed from Formula (4).

In that occasion, the fluctuation quantity of the computed position of the servo signal readout device is obtained from Formula (5) and Formula (6).

$$POS1' = k(A1)/(B+\Delta B) \qquad (3)$$

$$POS2' = k(A2)/(B+\Delta B) \qquad (4)$$

$$\Delta POS1 = |POS1' - POS1| = k(A1\Delta B)/B(B+\Delta B) \qquad (5)$$

$$\Delta POS2 = |POS2' - POS2| = k(A2\Delta B)/B(B+\Delta B) \qquad (6)$$

$$\Delta POS1 < \Delta POS2 \qquad (7)$$

Here, POS1' is the computed position of the servo signal readout device, wherein the readout is performed at the narrowest position of the nonparallel servo pattern and the detected long interval is B+ΔB. POS2' is a computed position of the servo signal readout device, wherein the readout is performed at the widest position of the nonparallel servo pattern and the detected long interval is B+ΔB. A1 is an interval between the patterns of the nonparallel servo pattern, wherein the readout is performed at the narrowest position of the nonparallel servo pattern. A2 is an interval between the patterns of the nonparallel servo pattern, wherein the readout is performed at the widest position of the nonparallel servo pattern. B is an interval between the servo pattern units. K is a coefficient.

As can be seen from Formula (3) or Formula (4), the computed position of the servo signal readout device is varied owing to the variation of the detecting cycle of the long interval B, when the writing position of the servo pattern SP is varied in the longitudinal directions. In other words, the computed position of the servo signal readout device is varied owing to the variation amount ΔB.

Thus, the record-reproduce equipment of the magnetic tape considers that the displacement in the width direction of the readout position is arisen, and controls the position of the magnetic head of the servo signal readout device in order to correct the displacement. This positioning of the magnetic head is performed even if the readout position in the width direction of the magnetic head is accurate.

As can be seen from Formula (7), which shows the magnitude relation between Formula (5) and Formula (6), the variation quantity of the computed position of the servo signal readout device, which is obtained when the readout is performed at the widest interval, becomes larger than the variation quantity of the computed position of the servo signal readout device, which is obtained when the readout is performed at the narrowest interval. Here, the readout performed at the widest interval means that the readout is performed at the position where the interval of the patterns of the nonparallel servo pattern is wide. The readout performed at the narrowest interval means that the readout is performed at the position where the interval of the patterns of the nonparallel servo pattern is narrow.

That is, the variation quantity (detecting error) in the width direction of the computed position becomes larger as the readout position in the width direction of the servo signal readout device approaches to the wide interval side of the patterns of the nonparallel servo pattern. Thereby, the positioning quantity of the servo signal readout device becomes larger.

SUMMARY OF THE INVENTION

The present invention relates to a servo control method for controlling the position of a magnetic head in order to record/reproduce a data on/from a magnetic tape. This magnetic tape has a plurality of servo tracks.

This servo control method is performed along the manner as described below.

(1) Writing a servo signal to each servo track of the magnetic tape;

(2) Adjusting a position in the width direction of the magnetic head based on the servo signal written on the magnetic tape when performing the record/reproduce of a data on/from the magnetic tape;

in the present invention, furthermore, the steps as below is contained in the above described steps.

(3) Reading the servo signal written on each of two servo tracks, simultaneously. Here, two servo tracks are selected among a plurality of servo trucks provided in the magnetic tape; and (4) Determining the position in the width direction of the magnetic head based on two servo signals, which are written on one servo track and another servo track of above selected two servo tracks, respectively. Here, two servo signals, which are written on one servo track and another servo track, are read out at the reading step (3).

In the present servo control method, preferably, the conclusive position in the width direction of the magnetic head is determined based on two detected positions, which are obtained from the two servo signals, separately. In this occasion, it is more preferable that two servo signals used for obtaining two detected positions are written on two adjoining servo tracks, respectively.

In the present servo control method, furthermore, the servo signal consists of group of servo pattern, and a prescribed reading position in the width direction of each servo pattern is read out at the reading step (3), and the prescribed reading position of one servo signal differs from the prescribed reading position of another servo signal.

In the present servo control method, still furthermore, the position in the width direction of the magnetic head is separately detected from one servo signal and another servo signal, and determining of the conclusive position in the width direction of the magnetic head is performed based on both detected positions. In this occasion, it is more preferable that the one servo signal and another servo signal are written on adjoining two servo tracks, respectively.

In the present servo control method, preferably determining of the conclusive position in the width direction of the magnetic head is performed by an equalization processing between two detected positions. Here, it is preferable that two detected positions are obtained from servo signals written on adjoining two servo tracks, separately.

In the present servo control method, still more preferably, the position in the longitudinal direction of the servo pattern of one servo signal does not line up with the position in the longitudinal direction of the servo pattern of another servo signal. In this occasion, additionally, it is preferable that one servo signal and another servo signal are written on adjoining two servo tracks, respectively.

The present invention relates to a record/reproduce equipment adopting the servo control method for controlling a position in the width direction of a magnetic head.

In this equipment, the control of a position in the width direction of a magnetic head is performed based on a servo signal written on said magnetic tape when performing a record/reproduce of a data signal on/from said magnetic tape having a plurality of servo tracks.

This record/reproduce equipment has a readout device and an adjusting device.

The readout device performs a readout of the servo signals written on each of two servo trucks, simultaneously. The adjusting device, which adjust the position in the width direction of the magnetic head based on both servo signals, which are written on one servo track and another servo track of two servo tracks, respectively.

In the present equipment, preferably, the servo signal consists of group of servo pattern, and the readout device read out a prescribed reading position in the width direction of the servo pattern. In that occasion, it is preferable that the reading position of one servo signal differs from the reading position of another servo signal.

In the present equipment, still more preferably, the adjusting device detects a position in the width direction of said magnetic head from one servo signal and another servo signal, respectively, and a conclusive position in the width direction of said magnetic head is determined based on both detected positions.

In the present equipment, furthermore, the adjusting device determines the conclusive position in the width direction of the magnetic head by an equalization processing between two detected positions The present invention relates to a servo writer, which is mainly equipped in the record/reproduce equipment. This servo writer writes a servo signal to each servo track of a magnetic tape. This servo writer equips a servo write device, which writes a servo signal having a plurality of nonparallel servo-patterns. In the present invention, preferably, the nonparallel servo pattern is consist of pair of pattern, which are located symmetrically with respect to the width direction axis of the magnetic tape, and the nonparallel servo-pattern written on one servo track becomes upside down with respect to the nonparallel servo-pattern written on another servo track.

In the present servo writer, preferably, a position in the longitudinal direction with respect to the magnetic tape of the nonparallel servo pattern written on one servo track does not line up with the position in the longitudinal direction with respect to the magnetic tape of the nonparallel servo pattern written on another servo track.

The present invention relates to a magnetic tape having a plurality of servo tracks.

This magnetic tape has a servo signal written on each servo track. In this magnetic tape, preferably, the servo signal has a plurality of nonparallel servo patterns consisting of pair of pattern, which are located symmetrically with respect to the width direction axis of the magnetic tape In the magnetic tape, preferably, the position of the nonparallel servo pattern written on one servo track does not line up with the position of the nonparallel servo pattern written on another servo track. In this occasion, it is preferable that one servo track and another servo track adjoins each other.

BRIEF DESCRIPTION OF THE DRAWINGS

FIG. 1 is explanation view showing the whole construction of the servo control system S.

DESCRIPTION OF THE PREFERRED EMBODIMENT

The preferred embodiment of the servo-control method according to the present invention will be described referring to the attached drawings.

The servo-control method according to the present invention performs the positioning of the magnetic head accurately by alleviating the occurrences of the detection error of the position in the width direction of the magnetic head. This accurate positioning can be achieved even if position in the longitudinal direction of the servo pattern on the magnetic tape varies.

For achieving the accurate positioning, the position in the width direction of the magnetic head is detected based on two servo signals, which are written on two adjoining servo track, respectively. Here, the nonparallel servo pattern written in one servo track become symmetrical with respect to the nonparallel servo pattern written in another servo track, which is adjoining to one servo track. In other words, the nonparallel servo pattern written in one servo track becomes upside down with respect to the nonparallel servo pattern written in adjoining another servo track.

The preferred embodiment of the present invention will be explained referring to the servo control system adopting the timing based method, in which the writing device of the servo signal and the recording-reproducing device of data signal are equipped.

In the servo control system according to the present embodiment, a servo writer, which writes the servo signal on the magnetic tape stored in the magnetic tape cartridge, is served as a writing device of the servo signal, a record-reproduce equipment of the magnetic tape, which records/reproduces the data signal on/from the magnetic tape, is served as a record-reproduce device.

The magnetic tape cartridge used for a high-density recording of the data of the computer is adopted in the present embodiment.

First Embodiment

First, a magnetic tape MT stored in a magnetic tape cartridge C according to the first embodiment will be explained referring to FIG. 3.

Figure 3:
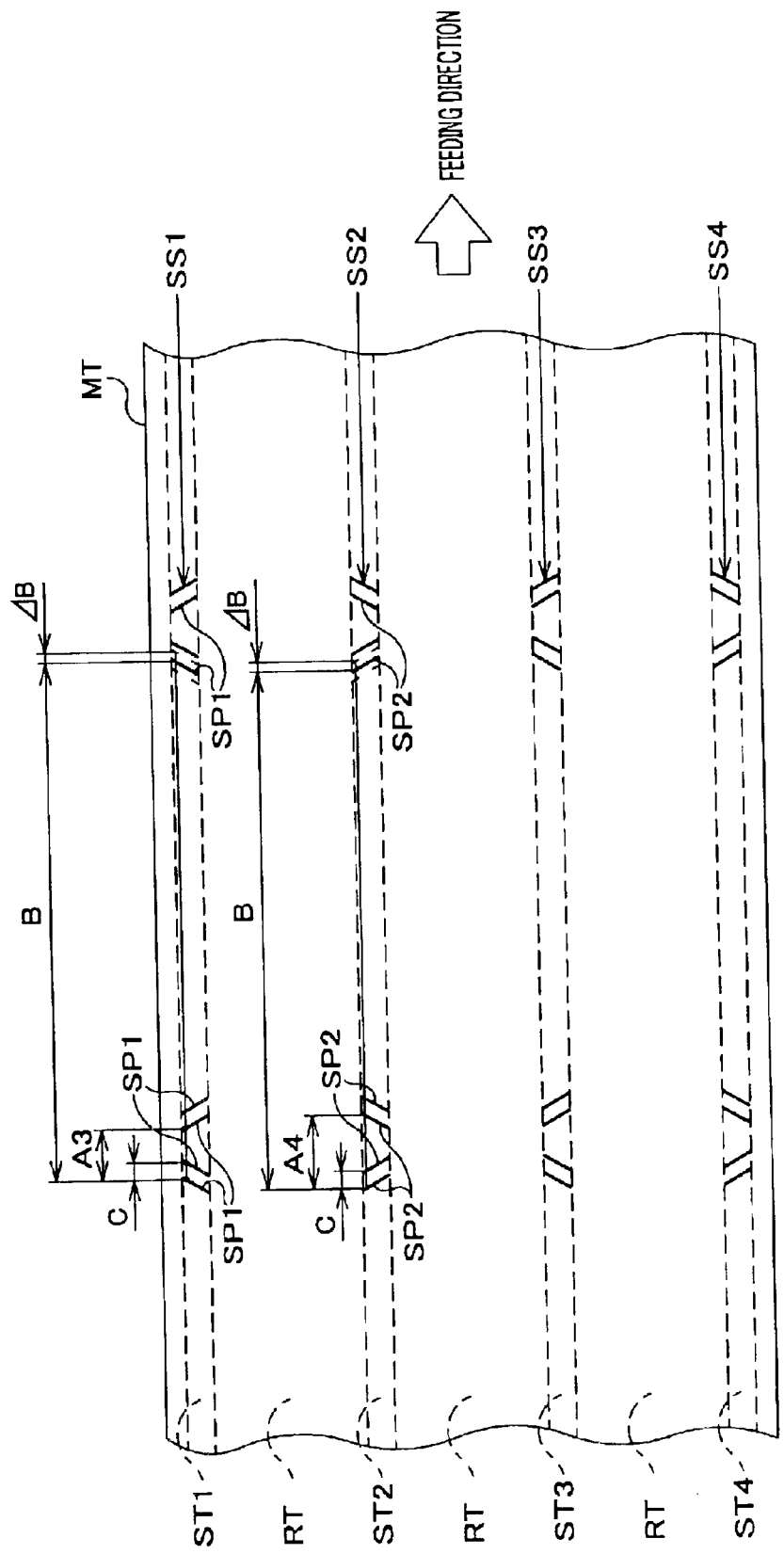
FIG. 3 is a plan view showing the part of the magnetic tape MT, onto which servo signals SS1, SS2, SS3, and SS4 are recorded.

FIG. 3 is a plan view showing the part of the magnetic tape MT, onto which servo signals SS1, SS2, SS3, and SS4 are written.

As shown in FIG. 3, the magnetic tape MT has a thin thickness, and has a servo tracks ST1, ST2, ST3, and ST4. The recording tracks RT, RT, and RT, which are located between the servo tracks ST1, ST2, ST3, and ST4, are provided along the longitudinal direction of the magnetic tape MT for achieving the high recording density.

Each recording track RT has 96 data tracks, and the data signal is recorded on each data track.

The servo signals SS1, SS2, SS3, and SS4 are written in the servo tracks ST1, ST2, ST3, and ST4, respectively.

In the servo signal SS1 and SS3, nonparallel servo patterns SP1 are arranged at short intervals (C: a constant value). This nonparallel servo pattern consists of pair of patterns, which are located symmetrically each other along the width direction axis of the magnetic tape MT. Each pattern has a predetermined intersection angle with respect to the longitudinal direction axis of the magnetic tape MT.

A servo pattern unit is arranged with the long interval (B: predetermined value) along the longitudinal direction of the magnetic tape MT. The servo pattern unit is consisting of a plurality nonparallel servo patterns.

In the servo signal SS2 and SS4, on the other hand, each nonparallel servo patterns becomes upside down with respect to each nonparallel servo patterns of the servo signal SS1. The locating condition of each nonparallel servo patterns is same as that of servo signal SS1 except for the locating direction.

Each nonparallel servo signals SP1, SP1, SP2, and SP2 are arranged in a line at the same position with respect to the longitudinal direction of the magnetic tape.

Figure 2:
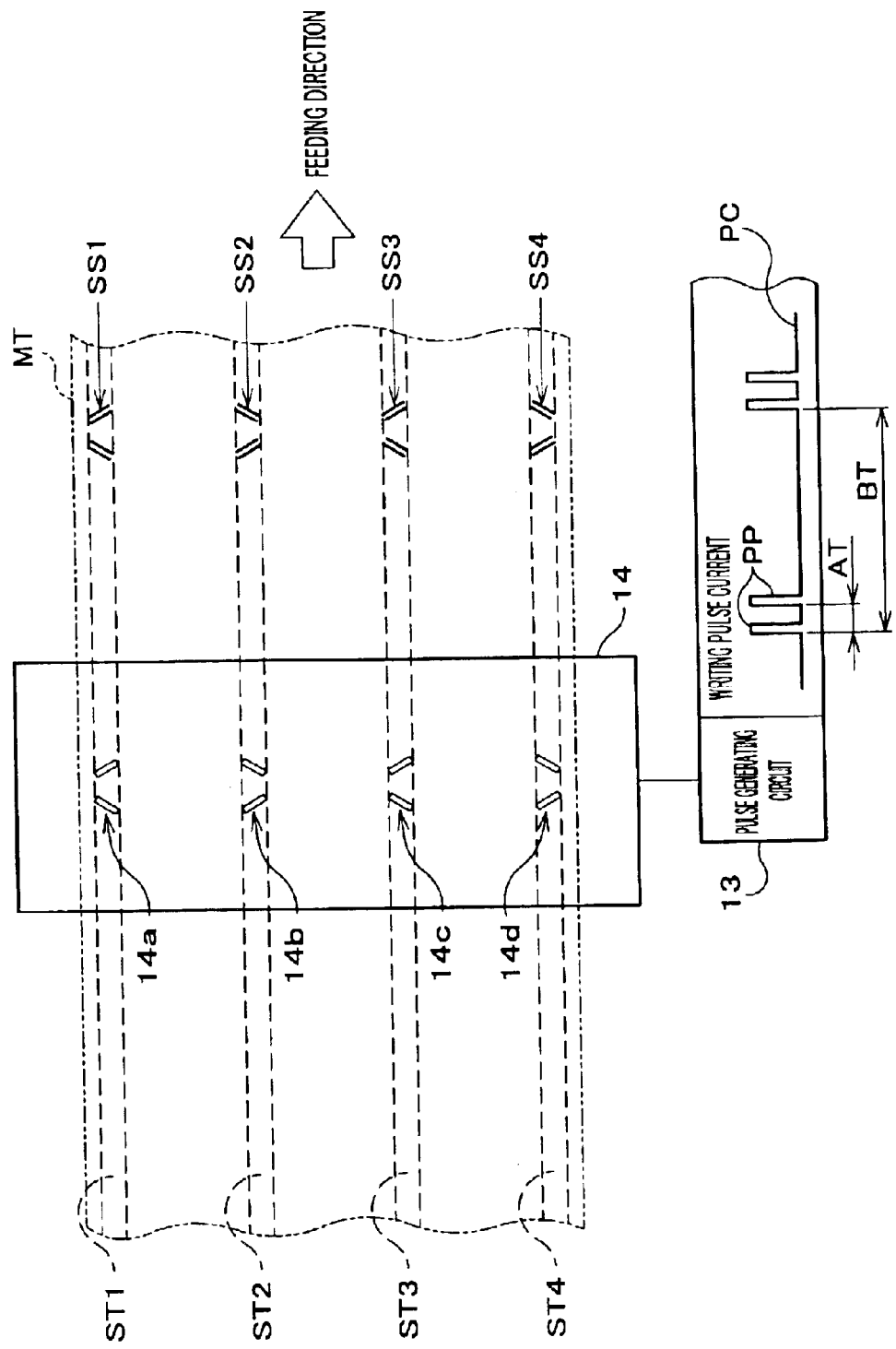
FIG. 2 is a schematic plan view of the servo recording head 14 according to the first embodiment.

Next, the explanation about the construction of the servo writer 1 will be carried out with reference to FIGS. 2, and 3.

FIG. 1 is explanation view showing the whole construction of the servo control system S.

FIG. 2 is a schematic plan view of the servo write head 14 according to the first embodiment.

The servo writer 1 mainly equips a feed reel 10, a wind-up reel 11, a drive unit 12, a pulse generating circuit 13, a servo write head 14, and a control unit 15.

The servo writer 1 also equips a power unit, a cleaning unit for cleaning the magnetic tape MT, a verify unit, which performs the checkup of the servo signal SS written on the magnetic tape MT, and the like.

The magnetic tape MT, which is obtained from the raw roll of a magnetic tape by slitting, is winded around the feed reel 10. When performing the writing of the servo signal SS1, SS2, SS3, and SS4, the magnetic tape MT is fed out from the feed reel 10.

The magnetic tape MT fed out from the feed reel 10 is led to the servo write head 14 through a guide 10a and the like.

Then, the magnetic tape MT after writing of the servo signal SS1, SS2, SS3, and SS4 is finished is led to the wind reel 11 through the guide 11a and the like.

The wind-up reel 11 is driven by the drive unit 12, and winds the magnetic tape MT around it.

The drive unit 12 drives and rotates the wind-up reel 11, and has a motor (not shown), a motor drive circuit (not shown) for supplying the electric current to the motor, a gear (not shown) for connecting a motor shaft with the wind-up reel 11, etc.

In the drive unit 12, the motor current is generated by the motor drive circuit in response to the motor current signal outputted from the control unit 15. The motor current is supplied to the motor for generating the rotative driving force. Then, the driving force is transmitted to the wind-up reel 11 through the gear. Thus, the wind-up reel 11 is rotated.

The pulse generating circuit 13 is composed of various electronic parts, and supplies the writing current PC to the servo write head 14.

In the pulse generating circuit 13, as shown in FIG. 2, the plus pulse current PP is generated two times at short cycle (AT) in response to the pulse control signal outputted from the control unit 15. This generation of the plus pulse current PP with short cycle is repeated with long cycles (BT). Thereby, the writing current PC is generated.

This writing current PC is inputted to the coil (not shown) of the servo write head 14.

Here, the plus pulse current PP has a sufficient current value for magnetizing the magnetic layer of the magnetic tape, and is established in consideration of the characteristics of the coil and the like.

As shown in FIG. 3, the short interval (C) is settled by the short cycle (AT), which is established based on the feeding speed of the magnetic tape MT. On the other hand, the long interval (B) is settled by the long cycle (BT), which is established based on the feeding speed of the magnetic tape MT.

The servo write head 14 is a magnetic head used for writing the servo signals SS1, SS2, SS3, and SS4, and has a coil (not shown) for generating the magnetic flux. As shown in FIG. 2, head gaps 14a, 14b, 14c, and 14d are formed on the servo write head 14.

The head gaps 14a, 14b, 14c, and 14d are arranged in a line, and are arranged so that each head gap agrees with the servo tracks ST1, ST2, ST3, and ST4, respectively. The head gap 14a, 14b, 14c, and 14d are formed by utilizing Lithography adapting semiconductor technology.

As shown in FIG. 2, the head gaps 14a, 14c has a shape of nonparallel pattern. This, nonparallel pattern is composed of pair of patterns, in which each pattern are located symmetrically with respect to the width direction axis of the magnetic tape. Each pattern has a predetermined intersection angle with respect to the longitudinal direction axis of the magnetic tape.

On the other hand, as shown in FIGS. 2 and 3, the head gap 14b, 14d have a same shape as the head gap 14a, 14c, but the locating direction thereof becomes upside down.

In the servo write head 14, when the writing current PC is supplied from the pulse generating circuit 13 and the plus pulse current PP streams the coil, the magnetic layer of the magnetic tape MT is magnetized by the magnetic flux leaked from the head gap 14a, 14b, 14c, and 14d. On the other hand, when the writing current PC is supplied from the pulse generating circuit 13 and the zero current streams the coil, the magnetic layer of the magnetic tape MT is not magnetized.

Thus, the servo signals SS1, SS3 are written on the servo tracks ST1, ST3 of the magnetic tape MT, respectively. Additionally, the servo signals SS2 and SS2, which become upside down with respect to the servo signals SS1 and SS3, are written on the servo tracks ST2 and ST4 of the magnetic tape MT, respectively. Thereby, the servo pattern SP1 and the servo pattern SP2 become upside down each other.

The control unit 15 controls the actuation of the each unit of the servo writer 1, and has a central processing unit (CPU), various memory storages, and the like.

The control unit 15 generates a motor current signal, which controls the motor current of the drive unit 12, for making the feeding-rate of the magnetic tape constant at the time of writing the servo signals SS1, SS2, SS3, and SS4.

The control unit 15, furthermore, generates a pulse control signal and supplies it to the pulse generating circuit 13. This pulse control signal controls the current of the plus pulse current PP of the writing current PC, and also controls both short interval (C) and long interval (B) in order to establish the servo signal SS1, SS2, SS3, and SS4, in which nonparallel servo patterns are provided with short interval (C) and long interval (B). In other words, the control unit 15 generates the pulse pattern, which provides the timing by which the plus pulse current PP is generated.

The magnetic tape MT after writing the servo signals SS1, SS2, SS3, and SS4 is treated with cutting for adjusting the tape length. The magnetic tape MT after adjusting is wound around the reel CR. Then, the reel CR is stored in the magnetic tape cartridge, thereby the magnetic tape cartridge C is manufactured.

Next, the construction of the record-reproduce equipment 2 of the magnetic tape will be explained referring to FIGS. 3 to 7.

Figure 4:
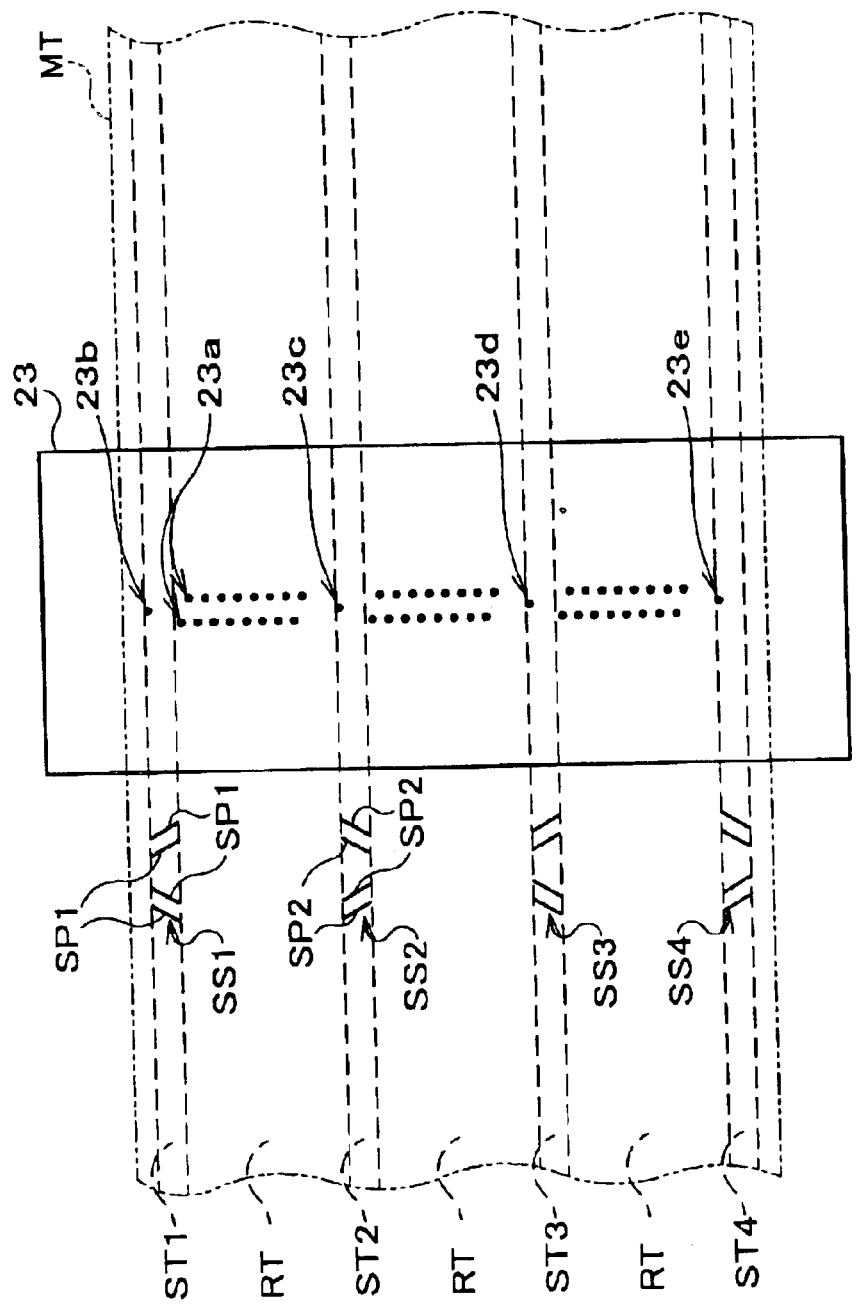
FIG. 4 is a schematic plan view showing the magnetic head 23 of the read-write equipment of the magnetic tape.

FIG. 4 is a schematic plan view showing the magnetic head 23 of the record-reproduce equipment 2 of the magnetic tape.

Figure 5:
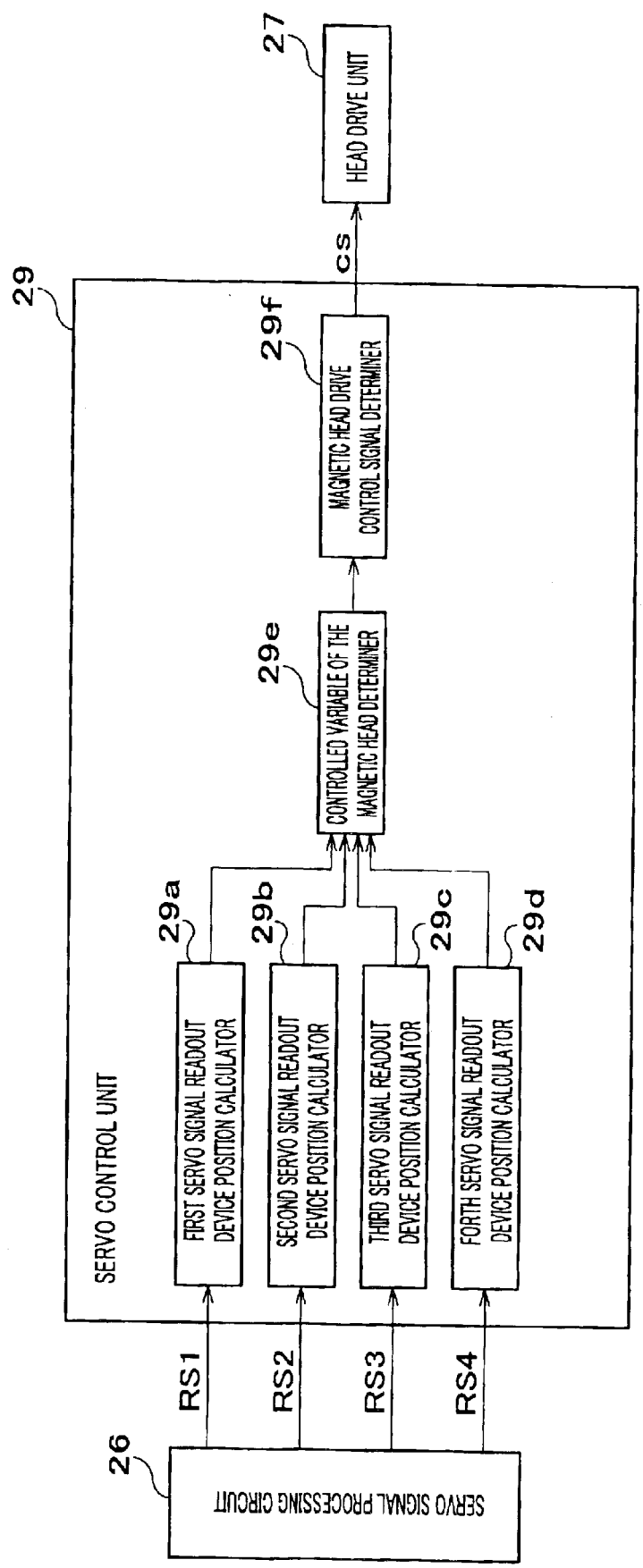
FIG. 5 is an explanation view showing the construction of the servo control unit of the read-write equipment of the magnetic tape.

FIG. 5 is an explanation view showing the construction of the servo control unit of the record-reproduce equipment of the magnetic tape.

Figure 6:
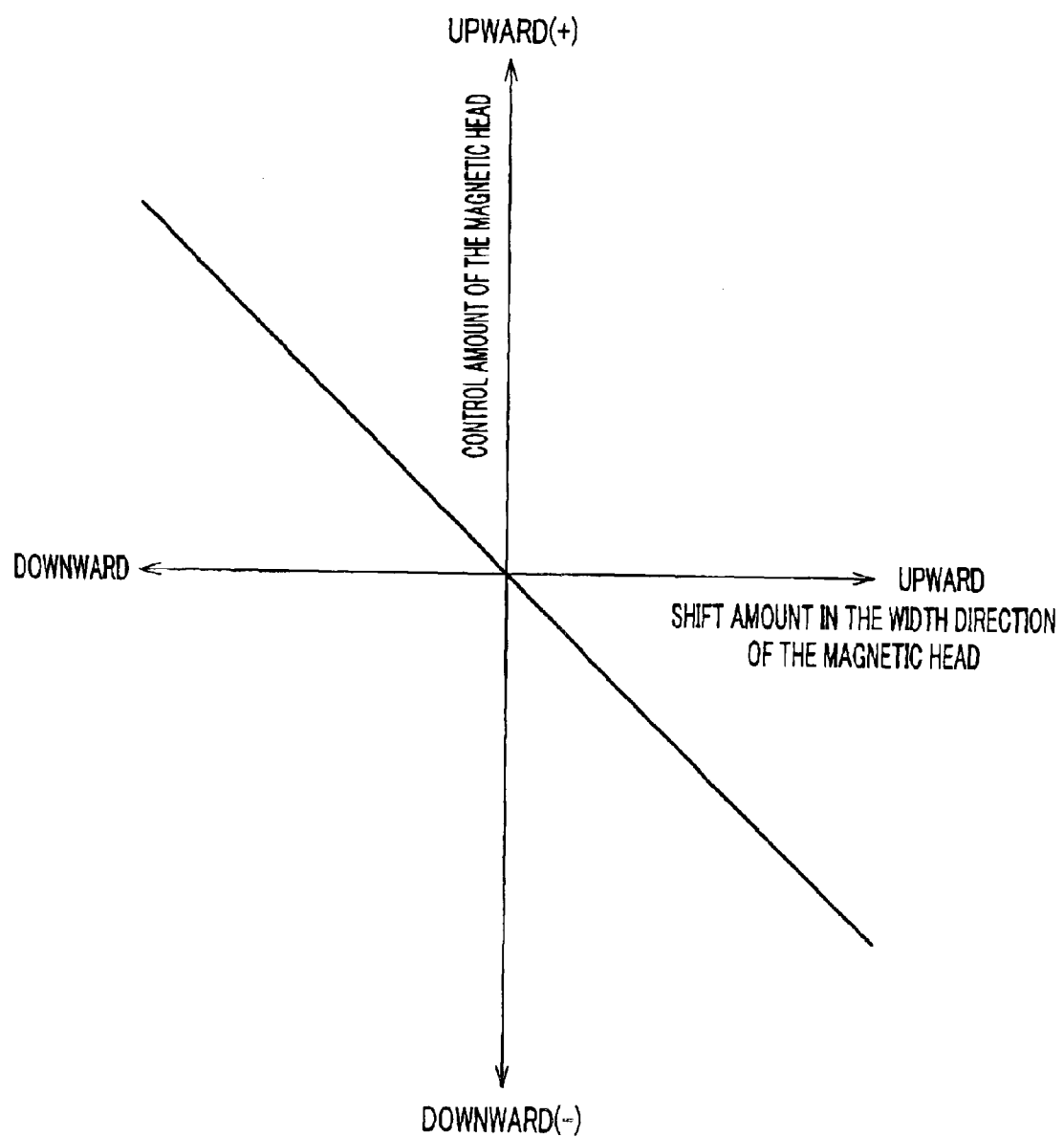
FIG. 6 is an explanation view showing the relation between the positioning control in the width direction of the magnetic tape and the location deviation in the width direction of the magnetic tape 23.

FIG. 6 is an explanation view showing the relation between the adjusting quantity of the position in the width direction of the magnetic tape and the deviation quantity of the position in the width direction of the magnetic tape 23.

Figure 7:
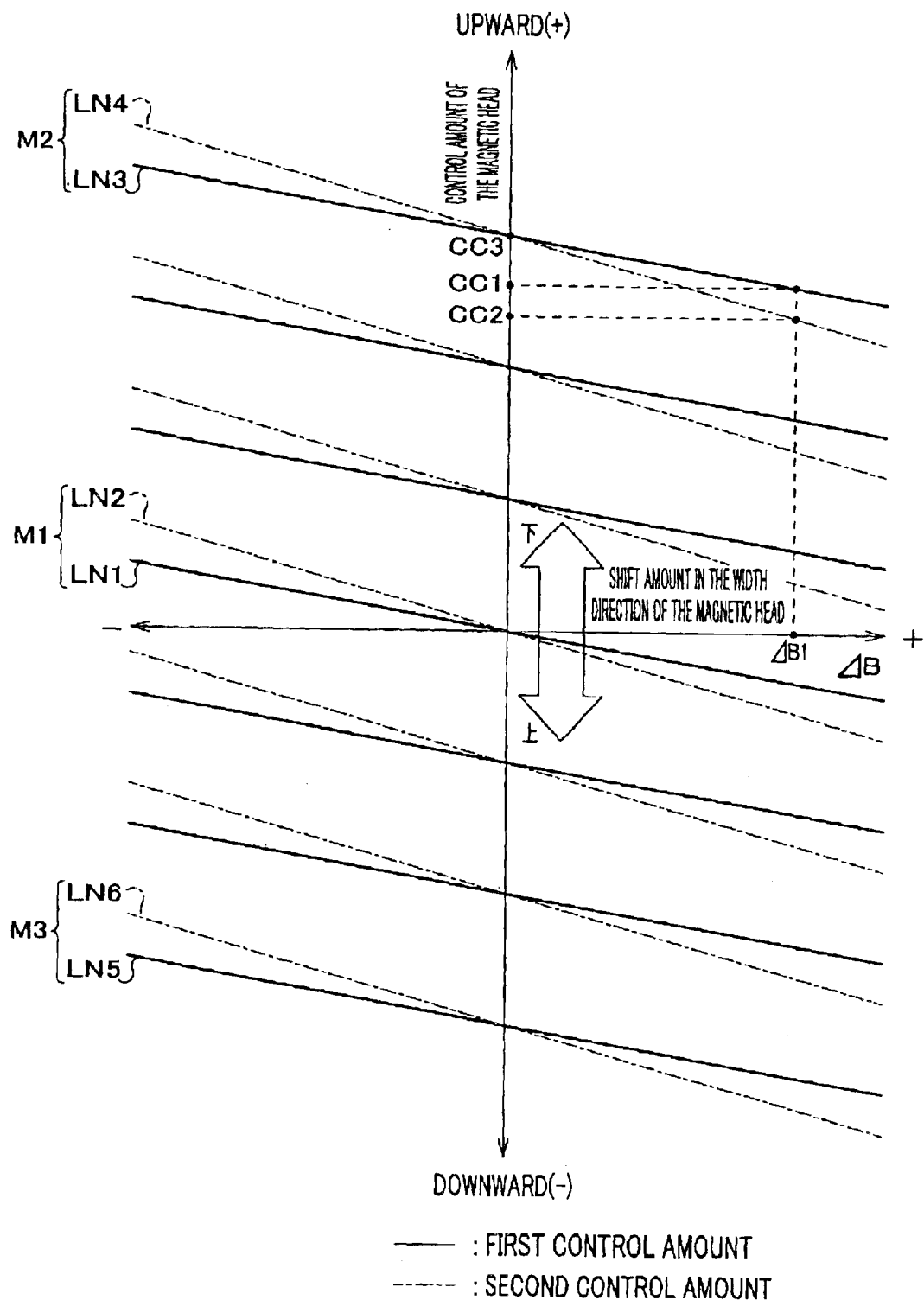
FIG. 7 is an explanation view showing the relation between the adjusting quantities of the position in the width direction of the magnetic head 23 and the deviation quantity of the writing position in the longitudinal direction of the servo pattern SP1 and SP2.

FIG. 7 is an explanation view showing the relation between the adjusting quantities of the position in the width direction of the magnetic head 23 and the deviation quantity of the writing position in the longitudinal direction of the servo pattern SP1 and SP2. The deviation of the writing position is caused based on the deviation quantity of the position in the width direction of the magnetic head 23.

As shown in FIG. 1, a record-reproduce equipment 2 of the magnetic tape MT equips a reel 20, drive units 21 and 22, a magnetic head 23, a recording current generating circuit 24, a reproducing signal processing circuit 25, a servo signal processing circuit 26, a head drive unit 27, and a control unit 28. The control unit 28 has a servo control unit 29.

The record-reproduce equipment 2 of the magnetic tape MT has a power unit (not shown), an entryway for performing the ejecting and injecting of the magnetic tape cartridge C, and a pickup device for achieving the pulling off of the magnetic tape MT from the magnetic tape cartridge C.

The record-reproduce equipment 2 of the magnetic tape MT is connected to the computer, and performs the recording of the data inputted from the computer on the magnetic tape MT as the data signal format, and performs the outputs of the data to the computer by loading the data from the magnetic tape MT.

The magnetic tape MT, as described above, has 288 data tracks.

In the read-write equipment 2 of the magnetic tape MT, the feeding from one end to another end of the magnetic tape MT is carried out 6 times (3 round trips) for recording/reproducing the data signal to/from the all data tracks. In that occasion, the recording of the data signal is performed on the 48 data tracks at one feeding.

Thereby, in the record-reproduce equipment 2, the reel CR plays a role of the feed reel when the reel 20 plays a role of wind-up reel. On the contrary, the reel CR plays a role of the wind-up reel when the reel 20 plays a role of feed reel.

When the magnetic tape cartridge C is inserted into the record-reproduce equipment 2, the tip part of the magnetic tape MT is pull out from cartridge C, and is attached to a hub of the reel 20.

The magnetic tape MT is fed out from the reel CR at the time of feeding. In other words, when the magnetic tape MT is fed to right side of FIG. 1, the magnetic tape MT is fed out from the reel CR.

The magnetic tape MT fed out from the reel CR is lead to the magnetic head 23 through the guide 20a, and the like.

The magnetic tape MT after achieving the recording or loading of the data signal by the magnetic head 23 is fed to the reel 20 through the guide 20b.

The reel 20 is driven by the drive unit 22, and winds the magnetic tape MT around it.

When the magnetic tape is fed to the reverse direction, on the other hand, the magnetic tape MT is fed out from the reel 20. In other words, when the magnetic tape MT is fed to left side of FIG. 1, the magnetic tape MT is fed out from the reel 20.

The magnetic tape fed out from the reel 20 is lead to the magnetic head 23 through the guide 20b and the like.

Then, the magnetic tape MT after achieving the recording or loading of the data signal by the magnetic head 23 is fed to the reel CR through the guide 20a.

The reel CR is driven by the drive unit 21, and winds the magnetic tape around it.

The drive unit 21 drives the reel CR, and has a same construction as the above described drive unit 12.

The drive unit 22 also drives the reel 20, and has a same construction as the above described drive unit 12.

The magnetic head 23 performs the recording/reproducing of the data signal, and is also used for loading the servo signal SS.

As shown in FIG. 4, this magnetic head 23 has a data signal record-reproduce device 23a and the servo signal readout device 23b, 23c, 23d, and 23e.

The magnetic head 23 is composed of 16 data signal record/reproduce devices 23a, which are alternately arranged in two sequences so that each position of the data signal record-reproduce device 23a agrees with each prescribed position in the width direction of each record tracks RT.

Each data signal record-reproduce device 23a is arranged with very narrow interval, and is arranged so that the location thereof may agree with the position in the width direction of the data tracks (not shown).

The position of the magnetic head 23 is slightly shifted in the width direction at every feeding of the magnetic tape MT. Since there are 48 data signal record-reproduce device 23a, the record/reproduce of the data on/from the 288 data tracks is achieved by repeating this feeding of the magnetic tape MT 6 times.

As shown in FIG. 4, each position of a servo signal readout device 23b, 23c, 23d, and 23e agrees with each position of the servo track ST1, ST2, ST3, and ST4, respectively, and the servo signal readout device 23b, 23c, 23d, and 23e are arranged on the magnetic head 23 in a line.

The servo signal record-reproduce device 23b, 23c, 23d, and 23e are MR device, and have a narrow width, for example, several microns—10 microns, than the data signal record-reproduce device 23a. The servo signal record-reproduce device 23b, 23c, 23d, and 23e reads out the prescribed reading position of each servo signal SS1, SS2, SS3, and SS4, respectively. In the present embodiment, since the magnetic tape travels 6 times from one end to another end, the position of each servo signal record-reproduce device 23b, 23c, 23d, and 23e is shifted at every traveling. Thus, there are 6 places of the reading position on the servo signal SS1, SS2, SS3, and SS4.

To be more precise, when the feeding from one end to another end of the magnetic tape MT is finished while performing the readout at the first readout position of the servo signal SS1, the readout position changed to the second readout position of the servo signal SS1.

Then, the magnetic tape MT is fed to the reverse direction while performing the readout of the servo signal SS1 at the second readout position.

The readout by each servo signal readout device 23b, 23c, 23d, and 23e is performed at same reading position in the width direction of each servo signal SS1, SS2, SS3, and SS4. In other words, the readout position of each servo signal is the position, which only the same distance separated from the tip of the nonparallel servo pattern.

Thereby, when the servo signal readout device 23b reads the narrowest position of the unparallel patterns of the servo pattern SP1, the servo signal readout device 23c reads the widest position of the unparallel patterns of the servo pattern SP2.

Each servo signal readout device 23b, 23c, 23d, 23e reads the servo signal SS1, SS2, SS3, and SS4 by detecting the change of the electric resistance of the MR device. This change of the electric resistance of the MR device is caused depending on the outer magnetic field brought out from the magnetization of the magnetic tape MT.

In the MR device, the changing rate of the electric resistance caused by the external magnetic field is nonlinear, and the MR device is saturated when the external magnetic field becomes larger. Thus, the region, where the changing ratio of the electric resistance becomes linier by impressing the bias magnetic field, is used for detecting the change of the electric resistance.

The recording current generating circuit 24 shown in FIG. 1 supplies the recording current to the data signal record-reproduce device 23a of the magnetic head 23, and equips various electronic products. The recording current generating circuit 24 generates the recording current based on the recording current control signal, and supplies this recording current to the magnetic head 23.

The reproducing signal processing circuit 25 converts the data signal readout by the data signal record-reproduce device 23a of the magnetic head 23 to the signal, which can be handled by the control unit 28. This reproducing signal processing circuit 25 equips various electronic parts.

The reproducing signal processing circuit 25 converts the data signal depending on the change of the electric resistance of the MR device of the data signal record/reproducing device 23a, and transmits it to the control unit 28.

The servo signal processing circuit 26 converts the data signal readout by the servo signal readout device 23b, 23c, 23d, and 23e of the magnetic head 23 to the signal, which can be handled by the control unit 28.

This servo signal processing circuit 26 equips various electric parts.

The servo signal processing circuit 26 supplies the constant current to the servo signal readout device 23b, 23c, 23d, and 23e (MR device), and amplifies the voltage change caused by the change of the electric resistance of the MR device. The readout signal RS1, RS2, RS3, RS4 composed of a differential corrugated sheet (voltage value) is obtained based on the detected changing point of the magnetization.

Then, the servo signal processing circuit 26 outputs the readout signal RS1, RS2, RS3, and RS 4 to the servo control unit 29 (shown in FIG. 5).

The head drive unit 27 has a voice coil motor and the like, and controls the shift quantity in the width direction of the magnetic head 23.

The head drive unit 27 generates the driving force in compliance with the head control signal outputted from the servo control unit 29, and shifts the magnetic head 23 to the width direction by this driving force.

As an example of the shift in the width direction of the magnetic head 23, there are two types of position shift. First position shift is the shift to the adjoining data track of the data signal record/reproduce signal device 23a. This shift is performed after feeding from one end to another end of the magnetic tape MT is finished.

Second position shift is the shift performed for correcting the relative location between each data track and each data signal read/write device 23a. This shift is performed based on the servo signal SS1, SS2, SS3, and SS4.

The control unit 28 controls the actuation of each devices of the record-reproduce equipment 2 of the magnetic tape MT, and has a CPU, various recording devices, and the like.

The control unit 28 has a servo control device 29, which performs the positioning in the width direction of the magnetic head 23 based on the readout signal RS1, RS2, RS3, and RS4.

The control unit 28 generates the motor current signal, which controls the motor current of the drive unit 21 or the drive unit 22, for making the feeding speed of the magnetic tape MT constant at the time of recording/reproducing the data signal. The generated motor current signal is outputted to the drive unit 21 or the drive unit 22.

The control unit 28, additionally, generates the record current control signal based on the data inputted from outside, such as a video recorder, at the time of recording the data signal. The generated recording current signal is outputted to the recording current generating circuit 24.

The control unit 28 converts the data format of the reproducing signal into the output data format when performing the reproduction of the data signal. Here, the data signal is inputted from the reproducing signal processing circuit 25.

The servo control unit 29 controls the position in the width direction of the magnetic head 23, and is composed of a first servo signal readout device position calculator 29a, a second servo signal readout device position calculator 29b, a third servo signal readout device position calculator 29c, a forth servo signal readout device position calculator 29d, a controlled variable of the magnetic head determiner 29e, and a magnetic head drive control signal determiner 29f (shown in 5).

Hereinafter, a first servo signal readout device position calculator 29a is defined as first position calculator 29a, a second servo signal readout device position calculator 29b is defined as second position calculator 29b, a third servo signal readout device position calculator 29c is defined as third position calculator 29c, a forth servo signal readout device position calculator 29d is defined as forth position calculator 29d.

The first position calculator 29a computes the position in the width direction of the servo signal readout device 23b based on the readout signal RS1 of the servo signal SS1 inputted from the servo signal processing circuit 26.

The first position calculator 29a detects the interval A3 and interval B1 from the readout signal RS1. Here, as can be seen from FIG. 3, interval A3 is an interval between the patterns of the nonparallel servo pattern SP1. Interval B1 is an interval of the parallel patterns between the two servo patterns SP1, SP1, which are positioned with long intervals.

The first position calculator 29a computes the position in the width direction of the servo signal readout device 23b using the formula (8) based on the ratio of detected interval A3 and the interval B1.

If the interval between the servo pattern SP1 and SP1 does not change, the B1 equals to B, B1=B. On the other hand, if the interval between the servo pattern SP1 and SP1 is changed as a result of the occurrences of the expansion and contraction of the magnetic tape MT or the variations of the feeding speed of the magnetic tape MT, B1 does not agree with B. In that occasion, for example, if the interval prolongs delta B, B1 becomes B+delta B, (B+ΔB)(see FIG. 3).

The second position calculator 29b computes the position in the width direction of the servo signal readout device 23c based on the readout signal RS2 of the servo signal SS2 inputted from the servo signal processing circuit 26.

The second position calculator 29b detects the interval A4 and interval B2 from the readout signal RS2. Here, Interval A4 is an interval of the nonparallel patterns of the servo pattern SP2. Interval B2 is an interval of the parallel patterns between the two servo patterns SP2, SP2, which are positioned with long intervals.

The second position calculator 29b computes the position in the width direction of the servo signal readout device 23c using the formula (9) based on the ratio of detected interval A4 and the interval B2.

When the interval between the servo pattern SP2 and SP2 does not change, B2 equals to B, B2=B. On the other hand, if the interval between the servo pattern SP2 and SP2 is changed as a result of the occurrences of the expansion and contraction of the magnetic tape MT or the variations of the feeding speed of the magnetic tape MT, the interval B2 does not agree with B. In that occasion, for example, if the interval prolongs delta B, B2 becomes B+delta B, (B2=B+ΔB)(FIG. 3).

The third servo position calculator 29c computes the position in the width direction of the servo signal readout device 23d based on the readout signal RS3 of the servo signal SS3 inputted from the servo signal processing circuit 26.

The forth position calculator 29d also computes the position in the width direction of the servo signal readout device 23e based on the readout signal RS4 of the servo signal SS4 inputted from the servo signal processing circuit 26. The position in the width direction of the servo signal readout device 23e is obtained by the same manner as the case of second position calculator 29b.

$$POS3=k(A3)/(B1) \qquad (8)$$

$$POS4=k(A2)/(B2) \qquad (9)$$

Here, POS3 is the computed position of the servo signal readout device based on the servo signal SS1.

POS4 is a computed position of the servo signal readout device based on the servo signal SS2. A3 is an interval between the patterns of the nonparallel servo pattern of the servo pattern SP1 contained in the servo signal SS1. A4 is an interval between the patterns of the nonparallel servo pattern of the servo pattern SP2 contained in the servo signal SS2. B1 is an interval between the adjoining servo pattern units based on the servo signal SS1. B2 is an interval between the adjoining servo pattern units based on the servo signal SS. K is a coefficient.

If both interval between the servo pattern SP1 and SP1 of the servo signal SS1 and the interval between the servo patterns SP2 and SP2 of the servo signal SS2 varies, the computed position (POS3) by the first position calculator 29a differs from the computed position (POS4) by the second position calculator 29b even if the reading position in the width direction of the servo signal readout device 23b, 23c are accurate.

In that occasion, the fluctuation quantity of the computed position (POS3) by the first position calculator 29a differs from that of the computed position (POS4) by the second position calculator 29b.

When the interval A3 of the nonparallel patterns of the servo pattern SP1 is larger (smaller) than the interval A4 of the nonparallel patterns of he servo pattern SP2, as shown in FIG. 3, the fluctuation quantity of the computed position (POS3) by the first position calculator 29a becomes larger (smaller) than the fluctuation quantity of the computed position (POS4) by the second position calculator 29b.

The controlled variable of the magnetic head determiner 29e defines the adjusting quantity of the position in the width direction of the magnetic head 23 based on each of the computed position of the servo signal readout device 23b, 23c, 23d, and 23e.

In the controlled variable of the magnetic head determiner 29e, basically, the calculation is performed based on the computed position (POS3) and the computed position (POS 4). Here, the computed position (POS3) is computed by the first position calculator 29a based on formula (8), and the computed position (POS 4) is computed by the second position calculator 29b based on formula (9).

If either or both of the servo signal SS1 and the servo signal SS2 is/are not readout accurately, the calculation is performed based on the computed position by the third position calculator 29c, and the computed position by the forth position calculator 29d.

In the present embodiment, the explanation about three methods, which are carried out by the controlled variable of the magnetic head determiner 29e, will be carried out regarding as a determining method of the position in the width direction of the magnetic head.

First, the common part among three methods will be explained.

In the controlled variable of the magnetic head determiner 29e, the central position in the width direction with respect to the magnetic tape MT of the magnetic head 23 is computed based on the computed position (=POS3) by the servo signal readout device 23b. Hereinafter, this computed central position is defined as a first computed position.

In the controlled variable of the magnetic head determiner 29e, furthermore, the central position in the width direction with respect to the magnetic tape MT of the magnetic head 23 is computed based on the computed position (=POS4) by the servo signal readout device 23c. Hereinafter, this computed central position is defined as a second computed position.

The controlled variable of the magnetic head determiner 29e reduces the first computed position from the prescribed center position in the width direction of the magnetic head 23, and defines the reduced result as the first control amount.

The controlled variable of the magnetic head determiner 29e reduces the second computed position from the prescribed center position in the width direction of the magnetic head 23, and defines the reduced result as the second control amount.

The prescribed position in the width direction of the magnetic head 23 is predetermined position for each feeding of the magnetic tape. As described above, there are 6 prescribed position, and are established in a line along the width direction of the magnetic tape. The prescribed position is switched one by one at each feeding.

When the displacement in the width direction of the magnetic head 23 does not arise, both first control amount and second control amount becomes zero.

In the following explanations, term upward means the upper side in a figure, and term downward means the bottom side in a figure.

When downward displacement in the width direction of the magnetic head 23 arises, on the other hand, both the first control amount and the second control amount become plus value because upward displacement of the magnetic head 23 are required (FIG. 2).

When upward displacement in the width direction of the magnetic head 23 arises, furthermore, both the first control amount and the second control amount becomes minus value because downward displacement of the magnetic head 23 are required.

As can be seen from FIG. 6, when the magnetic head 23 is displaced upwardly (right side in figure) with respect to the width direction of the magnetic tape MT, the magnetic head 23 is shifted downwardly (left side in figure) with respect to the width direction of the magnetic tape MT depending on the displacing quantity of the position. When the magnetic head 23 is displaced downwardly with respect to the width direction of the magnetic head 23, on the other hand, the magnetic head 23 is shifted upwardly with respect to the width direction of the magnetic head 23 depending on the displacing amount.

Then, the first determining method of the position in the width direction of the magnetic head will be explained.

In the controlled variable of the magnetic head determiner 29e, the average value between the first control amount and the second control amount is computed.

Then, the obtained average value is defined as the adjusting quantity in the width direction of the magnetic head 23.

According to this method, adjusting quantity of the position is defined based on the averaged fluctuation quantity between the computed position (=POS3) and the computed position (=POS4), which are computed at servo signal readout device 29a and servo signal readout device 29b, respectively.

This defining of the adjusting quantity of the position is performed even if the variation of the interval between the servo pattern SP1 and SP1 and the variation of the interval between the servo pattern SP2 and SP2 arise. Thereby, the occurrence of the detecting error in the adjusting quantity of the position in the width direction of the magnetic head can be prevented.

Next, second determining method of the position in the width direction of the magnetic head by the magnetic head control amount determiner 29e will be explained.

The magnetic head control amount determiner 29e performs the weighting to the first control amount and the second control amount based on the each interval (A3, A4) of the nonparallel patterns of the servo pattern SP1, SP2.

The controlled variable of the magnetic head determiner 29e computes the average between the weighted first control amount and the weighted second control amount. The average value is defined as the adjusting quantity in the width direction of the magnetic head 23.

The weighting processing is performed along the manner as below. Fist comparing the interval A3 of the nonparallel patterns of the servo pattern SP1 with the interval A4 of the nonparallel patterns of the servo pattern SP2 (FIG. 3).

Then, if the interval A3 is small because of upward displacement in the width direction of the magnetic head 23, making the weight of the first control amount larger. In that occasion, it may be acceptable that defining the first control amount as the adjusting quantity in the width direction of the magnetic head. If the interval A4 is small because of downward displacement in the width direction of the magnetic head 23, on the other hand, making the weight of the second control amount larger. In this occasion, it may be acceptable that defining the second control amount as the adjusting quantity in the width direction of the magnetic head.

When the interval between the servo pattern SP2 and SP2, and the interval between the servo pattern SP1 and SP1 varies, each computed position (POS3, POS4) includes the different fluctuation quantity. In this second manner, therefore, weighing is preformed for computing the adjusting quantity in the width direction of the magnetic head 23 while putting the importance on the computed position with small fluctuation.

According to this second method, the detecting error contained in the adjusting quantity of the position can be reduced because the computed position with small fluctuation among two computed position (POS3, POS4) is mainly utilized even if the interval between the servo pattern SP2 and SP2 of the servo signal SS1 and the interval between the servo pattern SP1 and SP1 of servo signal SS2 varies.

Finally, third determining method of the position in the width direction of the magnetic head will be explained.

The controlled variable of the magnetic head determiner 29e compare the first control amount with the second control amount. When the first control amount agrees with the second control amount, the controlled variable of the magnetic head determiner 29e judges that the variation of the interval between the servo pattern SP1 and SP1 and the interval between the servo pattern SP2 and SP2 is not arisen. When the first control amount does not agree with the second control amount, on the other hand, the controlled variable of the magnetic head determiner 29e judges that the variation of the interval between the servo pattern SP1 and SP1 and the interval between the servo pattern SP2 and SP2 is arisen.

In other words, when the variation of the interval between the servo pattern SP1 and SP1 and the interval between the servo pattern SP2 and SP2 does not arise, if the position displacement in the width direction of the magnetic head 23 arise, the first control amount and the second control amount becomes same value depending on the displacing amount.

On the other hand, if the displacement of the position in the width direction of the magnetic head 23 does not arise under the same condition, each of the first control amount and the second control amount becomes zero.

In that occasion, if the first control amount agrees with the second control amount, the first control amount is defined as the adjusting quantity in the width direction of the magnetic head 23 by the controlled variable of the magnetic head determiner 29e.

When the variation of the interval between the servo pattern SP2 and SP2 and the interval between the servo pattern SP1 and SP1 arise, the detected value B1 and B2 does not become the prescribed value B. Thus, the first control amount does not agree with the second control value because the fluctuation amount contained in the computed position of the servo signal readout device 23c differs from the fluctuation amount contained in the computed position of the servo signal readout device 23b.

When the first control amount does not agree with the second control amount, the controlled variable of the magnetic head determiner 29e searches a plurality of maps based on the first control amount and the second control amount in order to obtain the adjusting quantity in the width direction of the magnetic head 23 and the variation quantity (delta B, ΔB) between the servo patterns SP1 and SP1 (the servo patterns SP2 and SP2).

Then, the obtained adjusting quantity of the position in the width direction of the magnetic head 23 is defined as the adjusting quantity of the position in the width direction of the magnetic head 23.

According to this third method, the adjusting quantity in the width direction of the magnetic head 23 in case there is no variation is obtained by referring to Map even if the variation of the interval between the servo pattern SP2 and SP1, which are written on the servo signal SS2, arises.

Thus, the adjusting quantity of the position in the width direction of the magnetic head 23 does not obtain the detecting error caused from the fluctuation quantity of computed position (POS3, POS4).

Here, Map is established in compliance with the six steps of prescribed positions along the width direction of the magnetic head 23.

In the present embodiment, Map used at each step is obtained in compliance with the displacing quantity of the position in the width direction of the magnetic head 23. To be more precise, the first (second) control amount is computed by many patterns, in which the displacing quantity of the position in the width direction of the magnetic head 23 and the variation quantity of the interval (=delta B) between the servo pattern SP1 and SP1 (SP2 and SP2) are adopted as a parameter.

FIG. 7 is an example of a Map, a horizontal axis thereof is the variation quantity of the interval between the servo patterns SP1 and SP1 and the interval between the servo patterns SP2 and SP2 (=delta B), and a vertical axis thereof is the adjusting quantity of the position of the magnetic head 23.

Two straight lines, which cross the vertical axis at point of delta B is zero, (ΔB=0), are correspond to the case where the prescribed position in the width direction of the magnetic head 23 is located at the most upward position of the nonparallel servo pattern.

The real straight line with small slope defines the first control amount based on the quantity of variation (ΔB) when the interval A3 of the nonparallel patterns of the servo pattern SP1 is most narrow.

The dashed line with large slope defines the second control amount based on the variation amount (ΔB) when the interval A4 of the nonparallel patterns of the servo pattern SP2 is most wide.

A plurality of sets of two strait lines, which are crossing on the vertical line at ΔB=0, are parallelizely provided along the vertical line. Each parallelized sets of two strait lines are provided in compliance with the displacing quantity of the position in the width direction of the magnetic head 23.

As described above, if there is no variation in the interval between the servo pattern SP1 and SP1 and the interval between the servo pattern SP2 and SP2, since the first control amount agrees with the second control amount, two line (real line and dashed line) crosses each other on the vertical line of delta B=0.

In the present embodiment, additionally, since a total 6 of prescribed detection position are defined on the magnetic head 23, there remain 5 patterns of line with respect to each prescribed position.

When the displacing quantity of the position in the width direction of the magnetic head is zero, for example, the first control amount and the second control amount are obtained from strait line LN1, and strait line LN2, respectively.

To be more precise, the first control amount is obtained from the strait line LN1 based on the variation quantity (delta B, ΔB) between the servo pattern SP1 and SP1. The second control amount is obtained from the strain line LN2 based on the variation quantity (delta B, ΔB) between the servo pattern SP2 and SP2. As this, the map M1 is composed of a set of the first control amount and the second control amount, which are obtained based on each variation quantity (delta B), respectively.

When the magnetic head 23 is displaced downwardly in FIG. 3, the first control amount is obtained from line LN3 based on the variation quantity (ΔB) between the servo pattern SP1 and SP1, the second control amount is obtained from line LN4 based on the variation quantity (ΔB) between the servo pattern SP2 and SP2. The map M2 is composed of the first control amount and the second control amount, which are obtained based on each variation quantity (delta B), respectively.

When the magnetic head 23 is displaced upwardly in FIG. 2, the first control amount is obtained from line LN5 based on the variation quantity (ΔB), the second control amount is obtained from line LN6 based on the variation quantity (ΔB). The map M3 is composed of the first control amount and the second control amount, which are obtained based on each variation quantity (delta B), respectively.

In FIG. 7, only the Map corresponding to the seven types of the position displacement is shown, Map is not restricted to this, there are large number of Map, and many maps also exist according to it.

Then, the defining manner of the variation quantity (ΔB) between the servo pattern SP1 and SP1 (SP2 and SP2) and the adjusting quantity of the position in the width direction of the magnetic head 23 will be explained. Here, this defining is performed in the case where the magnetic head control amount determiner 29e computes the CC1 as first control amount and computes the CC2 as second control amount.

CC1 and CC2 are computed based on the same varying quantity (ΔB) of the servo patterns SP1 and SP1 (Sp2 and SP2) and the same displacing quantity of the position in the width direction of the magnetic head 23.

In that occasion, the Map, in which the first control amount is CC1 and the second control amount is CC2 under the condition that the variation quantity is delta B (ΔB), is searched out from a plurality of Maps.

From this searched Map, defining the value of delta B as the variation quantity between the servo pattern SP1 and SP1 (SP2 and SP2), and defining the adjusting quantity of the position of the magnetic head 23, which is obtained from Map in case of delta B is zero (ΔB=0), as the adjusting quantity of the position in the width direction of the magnetic head 23.

To be more precise, the Map, in which the first control amount is CC1, the second control amount is CC2, and delta B equals to delta B1 (ΔB=ΔB1), is searched out from a plurality of Maps. Then, defining the value of delta B1 as the variation quantity (delta B) between the servo pattern SP1 and SP1 (SP2 and SP2), and defining CC3 as the adjusting quantity of the position in the width direction of the magnetic head 23 from this searched Map.

Thereby, the controlled variable of the magnetic head determiner 29e defines the CC3 as the adjusting quantity of the position in the width direction of the magnetic head 23.

The magnetic head drive control signal determiner 29f defines the head control signal based on the adjusting quantity of the position in the width direction of the magnetic head outputted from the controlled variable of the magnetic head determiner 29e. Then, the defined head control signal is outputted to the head drive unit 27.

The magnetic head drive control signal determiner 29f defines the head control signal. In that occasion, this defining is performed by considering the adjusting quantity of the position in the width direction of the magnetic head on the shifting quantity. Here, the sifting quantity is determined based on the prescribed center position in the width direction of the magnetic head 23.

Figure 8:
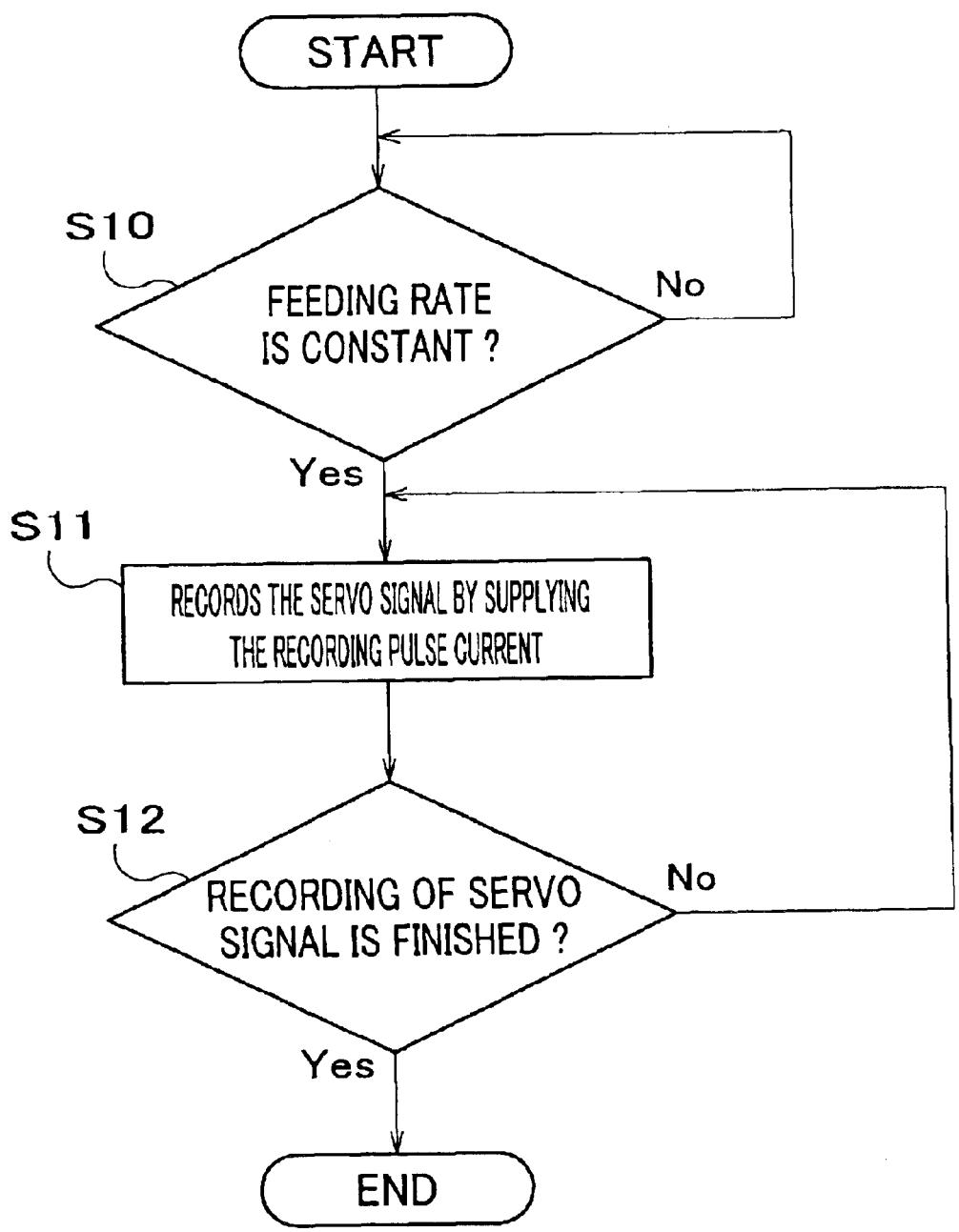
FIG. 8 is explanation view of the servo control method performed by the servo writer according to the present embodiment.

Next, the flow of the operation of the servo writer 1 will be explained along the flow chart shown in FIG. 8 while referring to FIGS. 1 through 3 as required.

First, the feed reel 10, around which the magnetic tape MT no data is recorded thereon is wound, is mounted on the servo writer 1, and next, the servo writer 1 is actuated.

Then, the control unit 15 generates the motor current signal for making the feeding rate of the magnetic tape MT constant, and supplies it to the drive unit 12. The drive unit 12 drives the motor based on the motor current signal and rotates the wind-up reel 11.

When the wind-up reel 11 is rotated, the control unit 15 detects the feeding rate of the magnetic tape MT, and checks whether or not the feeding rate of the magnetic tape MT is constant (Step 10).

The control unit 15 controls the feeding rate of the magnetic tape MT so that the feeding rate thereof is kept at constant rate. This control is performed based on the actual feeding rate of the magnetic tape MT while recording of the servo signal SS1, SS2, SS3, and SS4 is carrying out.

When the feeding rate of the magnetic tape MT becomes constant, the control unit 15 generates the pulse control signal, and outputs it to the pulse generating circuit 13. This pulse control signal is used for controlling the current value of the plus pulse current PP of the writing current PC, and is also used for defining the short cycle (AT) and the long cycle (BT).

After receiving the pulse control signal, the pulse generating circuit 13 adds the writing current PC, and supplied it to the servo write head 14 (Step 11).

When the plus pulse current PP is supplied, the corresponding position of the magnetic layer of the magnetic tape MT is mangnetized by the magnetic flux, which is leaked from the head gap 14a, 14b, 14c, and 14d. Thereby, the servo signal SS1, SS2, SS3, and SS4 are recorded on the servo track ST1, ST2, ST3, and ST4, respectively.

In each servo signal SS1, SS2, SS3 and SS4, a plurality of nonparallel servo patterns SP1 or SP2, which are composed of pair of patterns, is written. Each nonparallel servo patterns of servo signal SS1 and SS3 becomes upside down with respect to each nonparallel servo patterns of the servo signal SS2 and SS4.

In two adjoining servo tracks, the nonparallel servo patterns SP1 and SP2, which become upside down each other, are written on the servo track, respectively.

In the present embodiment, furthermore, the motion at step 11 of servo writer corresponds to the writing step of claims.

The servo writer 1 continues the recording of the servo signal SS1, SS2, SS3, and SS4 until all the magnetic tape MT is wound by the wind-up reel 11. Then, after the winding of the magnetic tape MT is achieved, the recording operation is finished (Step 12).

Next, the flow of the operation of the record-reproduce equipment of the magnetic tape 2 will be explained along the flow chart shown in FIG, 9 while referring to FIG. 1 and FIGS. 3 through 9 as required.

Figure 9:
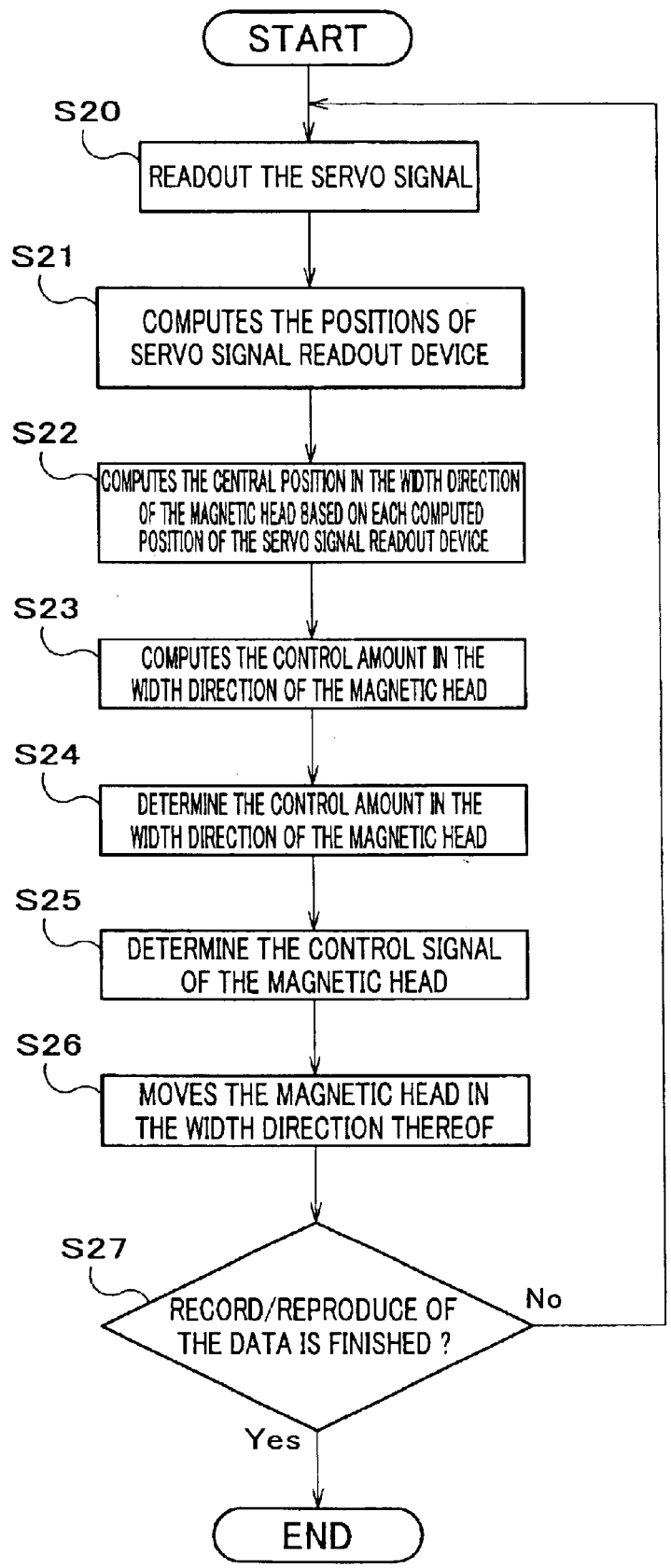
FIG. 9 is a flowchart explaining the servo-control method using the record-reproduce equipment of the magnetic tape 2.

FIG. 9 is a flowchart explaining the servo-control method using the record-reproduce equipment of the magnetic tape 2.

In the record-reproduce equipment 2, the recording command or the reproducing command of the data signal is inputted from the computer (not shown), which is connected to the record-reproduce equipment 2.

The control unit 28 generates the motor current signal so that the feeding rate of the magnetic tape MT becomes constant rate, and supplies it to the drive unit 22.

The drive unit 22 drives the motor based on the motor current signal and rotates the wind-up reel 20.

When the wind-up reel 20 is rotated, the servo signal processing circuit 26 generates the readout signal RS1, RS2, RS3, and RS4 in compliance with change of the electric current of the MR device by supplying the constant current to the servo signal readout device (MR device) 23b, 23c, 23d, and 23e, of the magnetic head 23 (Step 20).

In that occasion, the servo signal processing circuit 26 outputs the readout signal RS1, RS2, RS3, and RS4 to the servo control unit 29.

Here, a nonparallel servo pattern SP1 and SP2, which are upside down each other and are written on servo track ST1 and ST2, respectively, is readout.

In the present embodiment, the motion at step 20 of record-reproduce equipment of the magnetic tape 2 corresponds to the readout step of claims.

When the readout signal RS1, RS2, RS3, and RS4 is received, the servo control unit 29 computes the position in the width direction of the servo signal readout device 23b based on the readout signal RS1, and also computes the position in the width direction of the servo signal readout device 23c based on the readout signal RS2.

The servo control unit 29 computes the central position (the first computed position) in the width direction of the magnetic head 23 based on the computed position of the first servo readout device 23b, and also computes the central position (second computed position) in the width direction of the magnetic head 23 based on the computed position of the second servo readout device 23c(Step 22).

Then, the servo control device 29 computes the first adjusting quantity by subtracting the first computed position from the prescribed center position in the width direction of the magnetic head 23, and also computes the second adjusting quantity by subtracting the second computed position from the prescribed center position in the width direction of the magnetic head 23 (Step 23).

In the servo control unit 29, the adjusting quantity in the width direction of the magnetic head 23 is determined based on the first adjusting quantity and the second adjusting quantity using one method among the above-described three determining methods.

Finally, in the servo control unit 29, the head control signal is defined based on not only the shifting quantity computed based on the prescribed center position in the width direction of the magnetic head 23 but also the adjusting quantity in the width direction of the magnetic head 23 (Step 25).

Here, the position in the width direction of the magnetic head 23 is computed based on both of the servo signal SS1 and the servo signal SS2, which are written on the servo track ST1 and ST2, respectively.

The servo control unit 29 transmits the head control signal to the head drive unit 27.

In the present embodiment, the motion through step 21 to step 25 of the record-reproduce equipment 2 of the magnetic tape MT corresponds to the position determining in claims.

When the head control signal is transmitted, the head drive unit 27 generates the driving force to the boil coil motor based on the head control signal. Thus, magnetic head 23 is moved along the width direction thereof using this driving force.

In the record-reproduce equipment 2, the operation from Step 20 to Step 26 is preformed until the recording or the reproducing of the data signal is finished (Step 27).

In the servo control method according to the first embodiment, the adjusting quantity of the position in the width direction of the magnetic head 23 is determined based on two nonparallel servo patterns written on the adjoining servo signals.

To be more precise, in the servo signals, for example, since the nonparallel servo pattern SP1 written on the servo signal SS1 becomes upside down with respect to the non-parallel servo pattern SP2 written on the servo signal SS2, the influence of the fluctuation quantity in the obtained position of the magnetic head can be reduced even if the writing position in the longitudinal direction of to the servo pattern varies.

Thereby, the accurate positioning in the width direction of the magnetic head can be achieved.

Second Embodiment

Next, the second embodiment of the present invention will be explained.

In the present embodiment, the construction of the servo head of the servo writer 1 is differing from that of first embodiment. In this second embodiment, therefore, the location of the servo pattern of the servo signal to be recorded on the magnetic tape MT, and the operation in the servo control unit 29 of the record-reproduce equipment 2 of the magnetic tape are also differs from that of first embodiment.

In the following explanation, the different point from the first embodiment will be explained.

Figure 10:
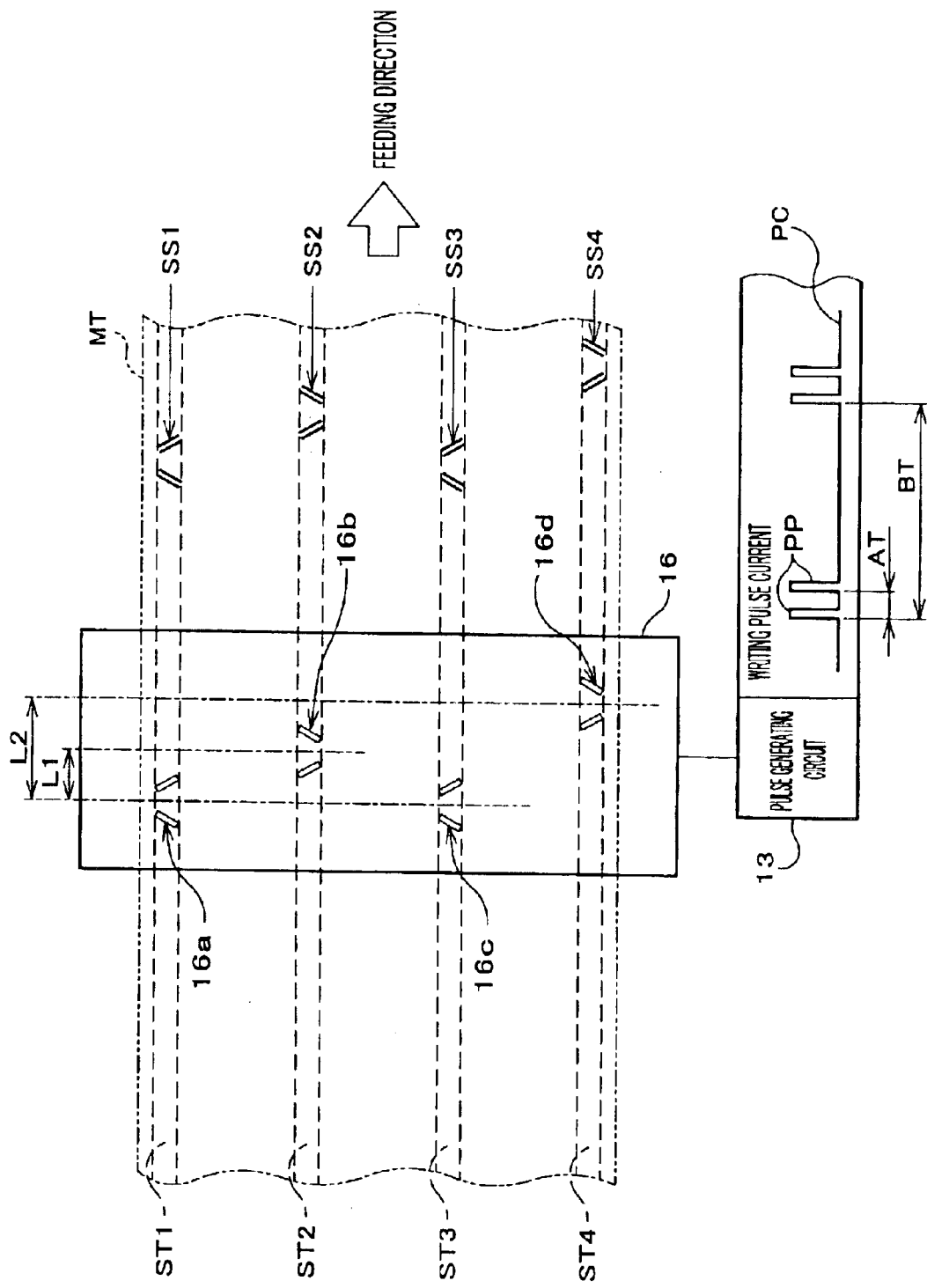
FIG. 10 is a schematic plan view of the servo write head 16 of the servo writer 1 according to the second embodiment.

The explanation about the servo write head 16 of the second embodiment will be carried out referring to FIG. 10. FIG. 10 is a schematic plan view of the servo write head 16 of the servo writer 1 according to the second embodiment.

The servo write head 16 is a magnetic head for writing the servo signal SS, and has a coil (not shown) for generating the magnetic flux. The head gap 16a, 16b, 16c, and 16d are formed on the servo writing head 16.

The head gaps 16a, 16b, 16c, and 16d are arranged in a line, and are arranged so that each head gap agrees with the servo track ST1, ST2, ST3, and ST4, respectively. The head gap 16a, 16b, 16c, and 16d are formed by utilizing Lithography adapting semiconductor technology.

The head gap 16b is positioned at the downstream side in the feeding direction of the magnetic tape MT with respect to the position of the head gap 16a and 16c. Here, the distance from head gap 16a to head gap 16b is L1.

The head gap 16d is positioned at the downstream side in the feeding direction of the magnetic tape MT with respect to the position of the head gap 16a and 16c. Here, the distance from head gap 16a to head gap 16d is L2, and L2>L1.

As shown in FIG. 10, the head gaps 16a, 16c has a shape of nonparallel pattern. This, nonparallel pattern is composed of pair of patterns, in which each pattern are located symmetrically with respect to the width direction axis of the magnetic tape MT. Each pattern has a predetermined intersection angle with respect to the longitudinal direction axis of the magnetic tape. On the other hand, as shown in FIGS. 10, the head gap 16b, 16d have a same shape as the head gap 16a, 16c, but the location thereof becomes upside down.

In the servo write head 16, when the writing current PC is supplied from the pulse generating circuit 13 and the plus pulse current PP streams the coil, the magnetic layer of the magnetic tape MT is magnetized by the magnetic flux leaked from the head gap 16a, 16b, 16c, and 16d. On the other hand, when the writing current PC is supplied from the pulse generating circuit 13 and the zero current streams the coil, the magnetic layer of the magnetic tape MT is not magnetized.

Thus, the servo signals SS1, SS3 are written on the servo tracks ST1, ST3 of the magnetic tape MT, respectively.

Additionally, the servo signals SS2 and SS4,which become upside down with respect to the servo signals SS1 and SS3, are written on the servo tracks ST2 and ST4 of the magnetic tape MT, respectively. Thereby, the servo pattern SP1 and the servo pattern SP2 become upside down each other.

Figure 11:
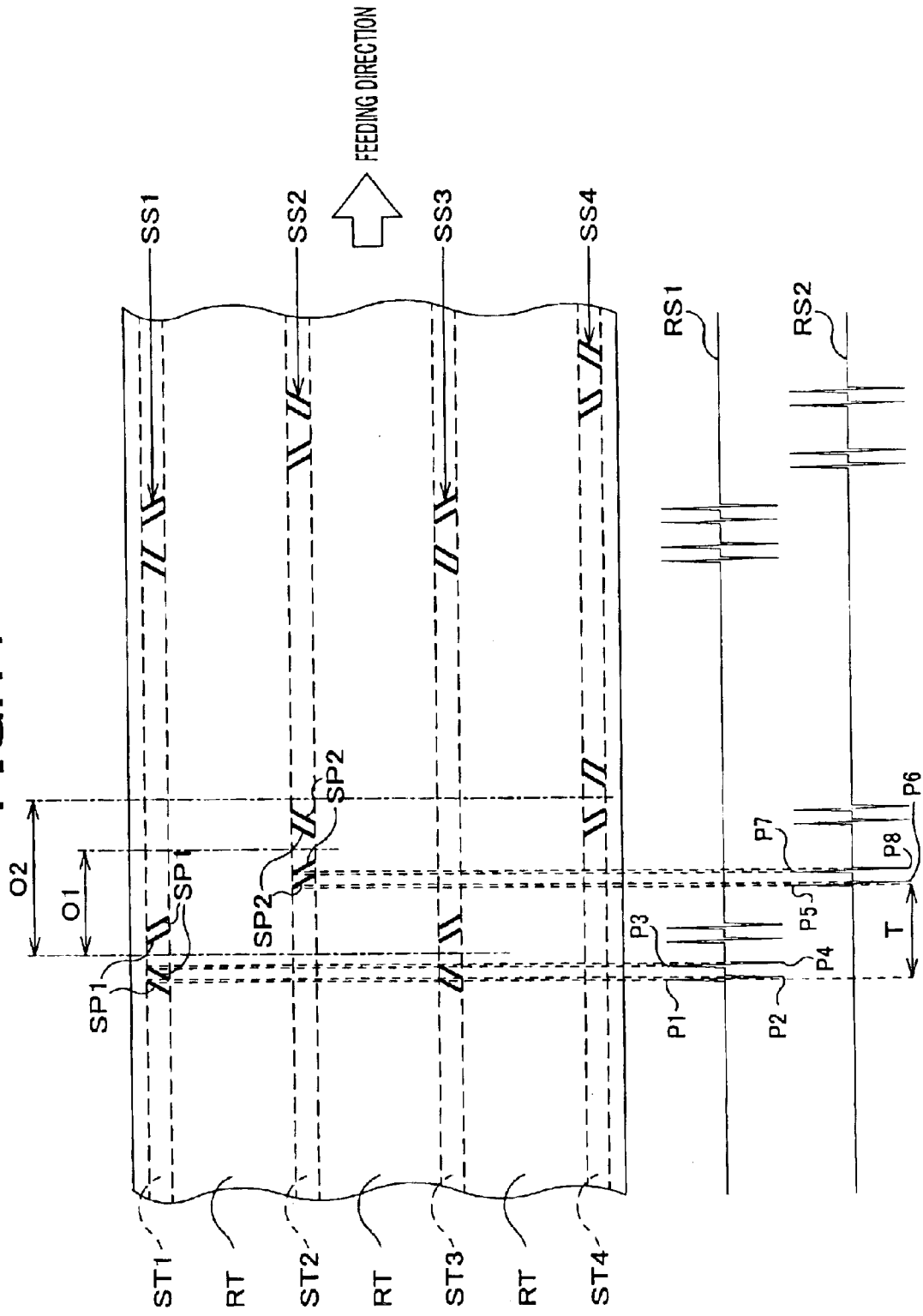
FIG. 11 is partially plan view of the magnetic tape MT to which the servo signals SS1, SS2, SS3, and SS4 are written.
Figure 12:
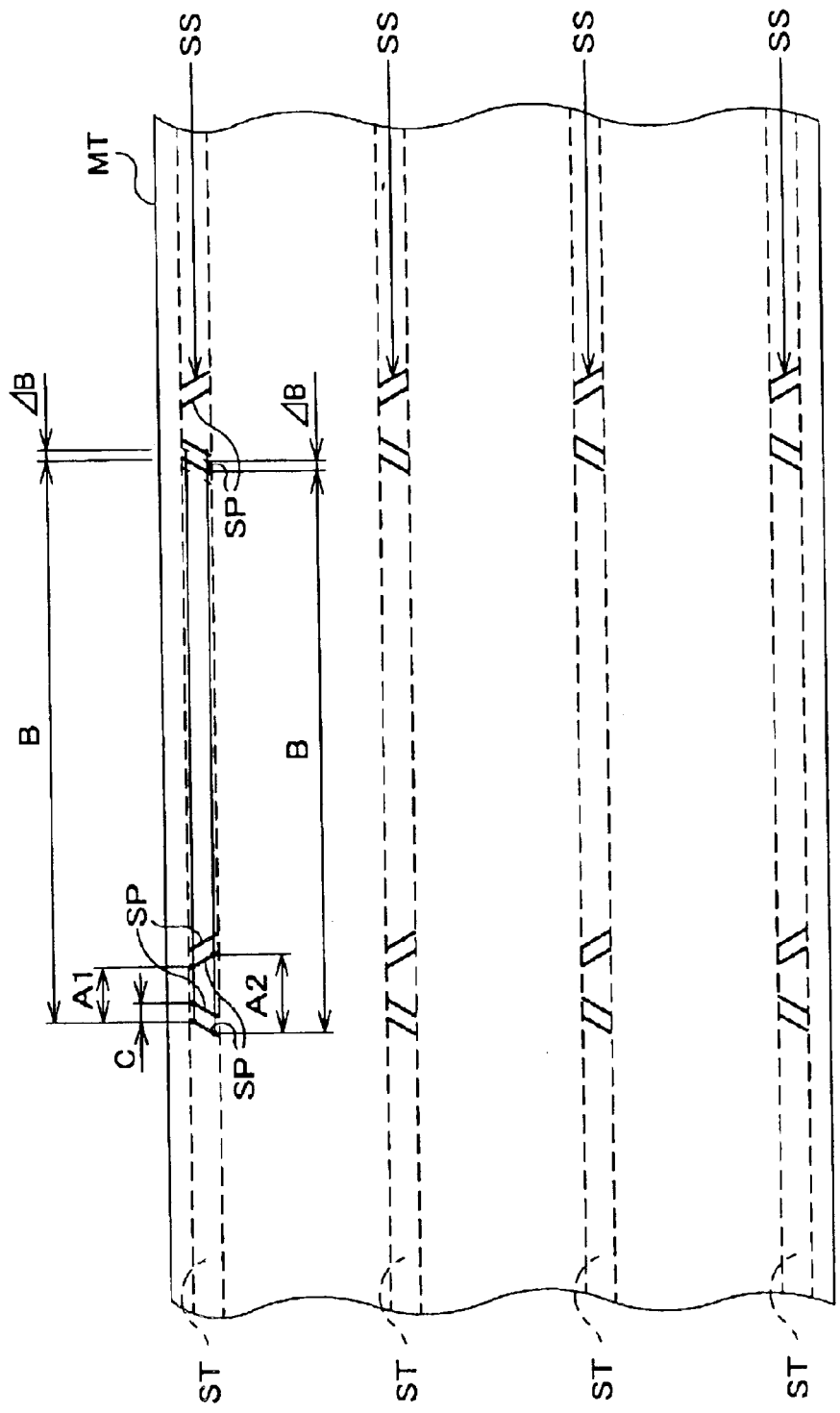
FIG. 12 is a partially plan view of a conventional magnetic tape to which a servo signal is written.

Next, the magnetic tape MT to which the servo signal SS1, SS2, SS3, and SS4 are written, will be explained referring to FIG. 11. FIG. 11 is partially plan view of the magnetic tape MT to which the servo signals SS1, SS2, SS3, and SS4 are written.

As shown in FIG. 11, the magnetic tape MT has a recording tracks RT, a data tracks (not shown), and a servo tracks ST1, ST2, ST3, and ST4. The servo signal SS1, SS2, SS3, and SS4 are written on the servo tracks ST1, ST2, ST3, and ST4, respectively. In the present embodiment, the shape, numbers, and position of them are same as that of above described first embodiment.

In the servo signal SS2, the servo pattern SP2 and SP2 are arranged at the downstream side with respect to the feeding direction of the magnetic tape MT with interval 01. In the servo signal SS4, on the other hand, the servo pattern SP2 and SP2 are arranged at the downstream side with respect to the feeding direction of the magnetic tape MT with interval 02. Here, interval 02>interval 01.

Next, the motion of the servo control unit 29, and the readout signal RS1 and RS2 will be explained referring to FIG. 1, FIG. 10, and FIG. 11.

As shown in FIG. 11, the read out signal RS1 is composed of the peak voltage P1, P2, P3, and P4, which are arisen when the changing point of magnetization in the servo signal SS1 is detected.

In the read out signal RS2, similarly, the changing point of magnetization in the servo signal SS2 is appeared as the peak voltage P5, P6, P7, and P8.

When compare the read out signal RS1 with the read out signal RS2, since there is provided the interval 01 between the servo signal SS2 and servo signal SS1, the peak voltage P5, P6, P7 and P8 of the read out signal RS2 are outputted after the peak voltage P1, P2, P3, and P4 of the read out signal RS1 are outputted. Here, the delay time is T.

When compare the readout signal RS3 with the readout signal RS4, additionally, since there is provided the interval 02 between the servo signal SS4 and servo signal SS1, the peak voltage P5, P6, P7 and P8 of the read out signal RS2 are outputted after the peak voltage P1, P2, P3, and P4 of the read out signal RS1 are outputted. Here, the delay time is the time longer than the delay time T.

In the servo control unit 29, if the readout signal RS1, RS2, RS3, and RS4 outputted from the servo signal processing circuit 26 are received, the delay time between each peak voltage of the readout signal RS1, RS2, RS3, and RS4 is detected.

In the servo control unit 29, the readout signal RS1, RS2, which has the delay time T, is selected among the detected delay time, and then defines the selected readout signal as the signal for adjusting the position in the width direction of the magnetic tape MT.

To be more precise, the combination of two servo signals SS1 and SS2 (or SS3, SS3) used for the positioning in the width direction of the magnetic head 23 is detected based on the delay time between each peak voltage of the readout signal RS1, RS2, RS3, and RS4.

According to the servo control method of the second preferred embodiment, since the interval between the servo pattern SP1 and the SP2 differs at each servo signal, the two combination of the servo signal can accurately be utilized.

As described above, the preferred embodiment of the present invention is explained. But the present invention is not limited to these embodiments, and is represented by various manners.

In the present invention, the combination of two servo signals, which are written in the adjoining servo track, separately, is used for positioning. But the combination of two servo signals is not limited to this as long as one servo signal is upside down with respect to another servo signal. Thus, for example, the combination of two servo signals, which are not written in the adjoining servo track, in other words, servo signals written every other servo track, may be acceptable.

In the present embodiment, additionally, the arithmetic expression may be adaptable in order to obtain the adjusting quantity of the position in the width direction of the magnetic head instead of the method based on Map.

In the present embodiment, the numbers of the recording track, the data track, and the servo track, and the shape of the servo pattern are not restricted, and various numbers of tracks and the various types of shapes can be acceptable.

In the present embodiment, the record-reproduce equipment of the magnetic tape is also used for achieving the readout of the servo signal. But it may be acceptable that the specific equipment, which can be used for recording only, or which can be used for the reproducing only.

In the present embodiment, the data signal recording/reproducing device, which performs record and reproduction of a data signal, is used.

But the device, which is used only for the data signal recording, or which is only used for the data signal reproduction, may be acceptable.

In the present embodiment, the MR device is uses as the magnetic head of the record-reproduce equipment of the magnetic tape, another magnetic head, such as a magnetic head adopting the electromagnetic induction technique using a coil, may be acceptable.

In the present embodiment, the feeding of the magnetic tape MT from one end to another end is repeated 6 times in order to achieve the record/reproduce of the date. The feeding time of the magnetic tape may be changed in compliance with the characteristics of the magnetic tape MT, such as, a recording capacity, the width of the servo track, the data track, and the magnetic head, etc.

In the present embodiment, still furthermore, there is provided four servo signal readout devices in compliance with the numbers of the servo tracks. But the numbers of the servo signal readout device may be changed in compliance with the numbers of the servo tracks.

In the present invention, additionally, the data signal recording/reproducing device, in which two servo signal readout devices are provided so that the one data track of the magnetic tape MT is just located therebetween, may be acceptable. In this device, the shifting quantity, after feeding from one end to another end of the magnetic tape MT is finished, may be widened. In this device, furthermore, the feeding time of the magnetic tape MT may be enlarged.

In the servo control method according to the present invention, the positioning in the width direction of the magnetic head is performed based on the servo signals, which are written on the adjoining servo tracks so that one nonparallel servo pattern written on one servo track becomes upside down with respect to the nonparallel servo pattern written on another servo track.

Thus, the detection error of the position in the width direction of the magnetic head can be decreased eve if the writing position in the width direction is varied. Thereby, the accurate positioning in the width direction of the magnetic head can be achieved.

What is claimed is:

1. A servo control method for controlling, based on a servo signal written on each servo track of a magnetic tape, the position of a magnetic head in order to record/reproduce a data on/from said magnetic tape having a plurality of servo tracks, said servo control method steps of:

reading said servo signal from of two servo tracks, simultaneously, said two servo tracks are selected among said plurality of servo tracks;

determining the conclusive position in the width direction of said magnetic head based on two servo signals, which are obtained from one servo track and other servo track of said two servo tracks, respectively; and adjusting the position in the width direction of said magnetic head in compliance with the conclusive position of the magnetic head.

2. A servo control method according to claim 1, wherein the conclusive position in the width direction of said magnetic head is determined based on two detected positions, which are obtained from said two servo signals, separately.

3. A servo control method according to claim 2, wherein said two servo tracks are adjoining servo tracks among said plurality of servo tracks.

4. A servo control method according to claim 3, wherein said servo signal consists of a group of servo pattern, and The reading of a servo signal is performed at a prescribed reading position in the width direction of each servo pattern, and said prescribed reading position of the one serve signal of said two servo signals, differs from said prescribed reading position of the other servo signal.

5. A servo control method according to claim 4, wherein the position in the longitudinal direction of the servo pattern of said one servo signal of said two servo signals does not line up with the position in the longitudinal direction of the servo pattern of the other servo signal.

6. A servo control method according to claim 4, wherein said servo pattern is a nonparallel servo pattern consisting of a pair of straight patterns, each extending across the width of the magnetic tape, and wherein a nonparallel servo pattern written on one servo track of the plurality of servo tracks becomes upside down with respect to another nonparallel servo pattern, which is at least one of the remainder of the plurality of servo patterns.

7. A servo control method according to claim 3, wherein determining of the conclusive position in the width direction of said magnetic head is performed by an equalization between said two detected positions.

8. A servo control method according to claim 2, wherein said servo signal consists of group of servo pattern, and the reading of a servo signal is performed at a prescribed reading position in the width direction of servo pattern, and said prescribed reading position of one servo signal of said two servo signals differs from said prescribed reading position of the other servo signal.

9. A servo control method according to claim 8, wherein the position in the longitudinal direction of the servo pattern of said one servo signal of said two servo signals does not line up with the position in the longitudinal direction of the servo pattern of the other servo signal.

10. A servo control method according to claim 8, wherein said servo pattern is a nonparallel servo pattern consisting of a pair of straight patterns, each extending across the width of the magnetic tape, and wherein a nonparallel servo pattern written on one servo track of the plurality of servo tracks becomes upside down with respect to another nonparallel servo pattern, which is at least one of the remainder of the plurality of servo patterns.

11. A servo control method according to claim 2, wherein determining of the conclusive position in the width direction of said magnetic head is performed by an equalization between said two detected positions.

12. A magnetic tape having a plurality of servo tracks, wherein a servo signal is written on each servo track, and said servo signal has a plurality of nonparallel servo patterns consisting of a pair of straight patterns, each extending across the width of the magnetic tape, and wherein a nonparallel servo pattern written on one servo track of the plurality of servo tracks becomes upside down with respect to another nonparallel servo pattern, which is at least one of the remainder of the plurality of nonparallel servo patterns.

13. A magnetic tape according to claim 12, wherein the position of said nonparallel servo pattern written on one servo track does not line up with the position of said nonparallel servo pattern written on another servo track.

14. The magnetic tape according to claim 12, wherein the nonparallel servo pattern and the another nonparallel servo pattern alternately repeat on the plurality of servo tracks with respect to the width direction.

15. A magnetic tape according to claim 12, wherein said pair of straight patterns are located symmetrically with respect to the width direction axis of said magnetic tape.

16. A magnetic tape having a plurality of servo tracks, wherein a servo signal is written on each servo track, and said servo signal has a plurality of nonparallel servo patterns consisting of a pair of straight patterns, each extending across the width of the magnetic tape, and wherein the nonparallel servo pattern written on one servo track of the plurality of servo tracks becomes upside down with respect to another servo pattern written on a servo track adjoining to said one servo track.

17. A magnetic tape according to claim 16, wherein the position of said nonparallel servo pattern written on one servo track of the plurality of servo tracks does not line up with the position of the servo pattern written on the servo track adjoining to said one servo track.

18. The magnetic tape according to claim 16, wherein the nonparallel servo pattern and the another nonparallel servo pattern alternately repeat on the plurality of servo tracks with respect to the width direction.

19. A magnetic tape according to claim 16, wherein said pair of straight patterns are located symmetrically with respect to the width direction axis of said magnetic tape.

20. A servo writer, which writes a servo signal to each servo track of a magnetic tape, said servo writer equips a servo write device, which writes a servo signal having a plurality of nonparallel servo-patterns, wherein said nonparallel servo pattern consists of a pair of straight patterns, each extending across the width of said magnetic tape, and said nonparallel servo-pattern written on one servo track becomes upside down with respect to said nonparallel servo-pattern written on another servo track.

21. A servo writer according to claim 20, wherein a position in the longitudinal direction with respect to said magnetic tape of said nonparallel servo pattern written on one servo track does not line up with the position in the longitudinal direction with respect to said magnetic tape of said nonparallel servo pattern written on another servo track.

22. A servo writer according to claim 21, wherein the nonparallel servo pattern written on the one servo track among the plurality of servo tracks becomes upside down with respect to the nonparallel servo pattern written on the another-servo track adjoining to said one servo track.

23. The serve writer according to claim 20, wherein the nonparallel servo pattern and the another nonparallel servo pattern alternately repeat on the plurality of servo tracks with respect to the width direction.

24. A servo writer according to claim 20, wherein said pair of straight patterns are located symmetrically with respect to the width direction axis of said magnetic tape.

25. A record/reproduce equipment for controlling a position in the width direction of a magnetic head based on a servo signal written on said magnetic tape when performing a record/reproduce of a data signal on/from said magnetic tape having a plurality of servo tracks, said record/reproduce equipment comprising:

a readout device, which performs a readout of said servo signals from two servo tracks, simultaneously, said two servo tracks are selected among said plurality of servo tracks; and an adjusting device, which determines the conclusive position in the width direction of said magnetic head based on two servo signals obtained from, one servo track and other servo track of said two servo tracks, respectively, and said adjusting device adjusts the position in the width direction of said magnetic head in compliance with the conclusive result of the magnetic head.

26. A record/reproduce equipment of a magnetic tape according to claim 25, wherein said servo signal consists of group of servo pattern, said readout device read out a prescribed reading position in the width direction of said servo pattern, and said reading position of one servo signal differs from said reading position of another servo signal.

27. A record/reproduce equipment of a magnetic tape according to claim 26, wherein said servo pattern is a nonparallel servo pattern consisting of a pair of straight patterns, each extending across the width of the magnetic tape, and wherein a nonparallel servo pattern written on one servo track of the plurality of servo tracks becomes upside down with respect to another nonparallel servo pattern, which is at least one of the remainder of the plurality of servo patterns.

28. A recording/reproduce equipment of a magnetic tape according to claim 27, wherein said pair of straight patterns are located symmetrically with respect to the width direction axis of said magnetic tape.

29. A record/reproduce equipment of a magnetic tape according to claim 25, wherein said adjusting device determines the conclusive position of said magnetic head based on two detected positions, which are obtained from said two servo signals, separately.

30. A record/reproduce equipment of a magnetic tape according to claim 29, wherein said adjusting device determines the conclusive position of said magnetic head by an equalization of said two detected positions.

* * * * *